US012153371B2

(12) United States Patent
Yamada

(10) Patent No.: US 12,153,371 B2
(45) Date of Patent: Nov. 26, 2024

(54) IMAGE FORMING APPARATUS AND PROCESS CARTRIDGE

(71) Applicant: FUJIFILM Business Innovation Corp., Tokyo (JP)

(72) Inventor: Yoshiteru Yamada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/451,592

(22) Filed: Aug. 17, 2023

(65) Prior Publication Data

US 2024/0302783 A1 Sep. 12, 2024

(30) Foreign Application Priority Data

Feb. 28, 2023 (JP) ................................ 2023-030159

(51) Int. Cl.
*G03G 15/00* (2006.01)
*G03G 5/07* (2006.01)
*G03G 21/00* (2006.01)

(52) U.S. Cl.
CPC ......... *G03G 21/0011* (2013.01); *G03G 5/071* (2013.01); *G03G 5/075* (2013.01); *G03G 15/752* (2013.01); *G03G 2221/0005* (2013.01)

(58) Field of Classification Search
CPC ............. G03G 15/752; G03G 21/0011; G03G 21/0017; G03G 2221/0005; G03G 5/071; G03G 5/075
See application file for complete search history.

(56) References Cited

U.S. PATENT DOCUMENTS 10,514,651 B1 * 12/2019 Watanabe .......... G03G 21/0017
11,892,780 B1 * 2/2024 Yamada ............... G03G 15/752
(Continued)

FOREIGN PATENT DOCUMENTS

JP 2014-066783 A 4/2014
JP 2019-164226 A 9/2019

*Primary Examiner* — Sophia S Chen
(74) *Attorney, Agent, or Firm* — Sughrue Mion, PLLC

(57) ABSTRACT

An image forming apparatus includes an electrophotographic photoreceptor that includes a conductive substrate and a photosensitive layer disposed on the conductive substrate, and does not contain lubricant particles in a region of 30% from a surface of an outermost surface layer with respect to a film thickness of the outermost surface layer or contains 5% by mass or less of the lubricant particles with respect to an entirety of the region, a charging device that charges a surface of the electrophotographic photoreceptor, an electrostatic latent image forming device that forms an electrostatic latent image on the charged surface of the electrophotographic photoreceptor, a developing device that develops the electrostatic latent image formed on the surface of the electrophotographic photoreceptor with a developer containing an electrostatic charge image developing toner to form a toner image, a transfer device that transfers the toner image to a surface of a recording medium, and a cleaning device that has a cleaning blade and cleans the surface of the electrophotographic photoreceptor by bringing the cleaning blade into contact with the surface after the toner image is transferred by the transfer device, in which a dynamic friction coefficient in a contact portion between the electrophotographic photoreceptor and the cleaning blade is 0.2 or greater and 0.6 or less.

19 Claims, 3 Drawing Sheets

(56) References Cited

U.S. PATENT DOCUMENTS

2014/0233998 A1* 8/2014 Watanabe .......... G03G 21/0017
399/350
2016/0033924 A1* 2/2016 Fukao ................ G03G 21/0017
399/350
2021/0026269 A1* 1/2021 Ishino .................. G03G 5/0546
2024/0053701 A1* 2/2024 Watanabe .......... G03G 21/0017

* cited by examiner

IMAGE FORMING APPARATUS AND PROCESS CARTRIDGE

CROSS-REFERENCE TO RELATED APPLICATIONS

This application is based on and claims priority under 35 USC 119 from Japanese Patent Application No. 2023-030159 filed Feb. 28, 2023.

BACKGROUND

(i) Technical Field

The present invention relates to an image forming apparatus and a process cartridge.

(ii) Related Art

JP2019-164226A discloses an image forming apparatus including an image carrying member that has a latent image formed thereon and is capable of carrying a toner image, a developing unit that develops the latent image formed on the image carrying member with a toner, and a cleaning unit that includes a blade-shaped elastic member coming into contact with the surface of the image carrying member, in which a friction coefficient Ft/Fn between the image carrying member and the elastic member is 0.85 or greater and 1.1 or less, and a magnitude WRFt (LMHI) of a self-excited vibration of a shear force of the elastic member in an LMH band is 1.5 gf or greater and 3.5 gf or less.

JP2014-66783A discloses a member for an image forming apparatus including an image holding member that has a surface on which a toner image is formed and transfers the toner image onto a recording medium, and a cleaning blade that cleans the surface of the image holding member by allowing a corner portion of a tip to be brought into contact with the surface and has a movement distance of 10 μm or greater and 30 m or less to a position of the corner portion in a state where the image holding member is driven, in a case where the position of the corner portion is used as a reference in a state where the image holding member is stopped.

SUMMARY

Aspects of non-limiting embodiments of the present disclosure relate to an image forming apparatus and a process cartridge that are capable of achieving both suppression of streak-like image defects caused by local turn-up of a cleaning blade and suppression of a filming phenomenon of an electrophotographic photoreceptor caused by body contact of a cleaning blade as compared with a case where an electrophotographic photoreceptor does not contain lubricant particles in a region of 30% from the surface with respect to the film thickness of an outermost surface layer or contains 5% by mass or less of lubricant particles with respect to the entire region and the dynamic friction coefficient in a contact portion between the electrophotographic photoreceptor and the cleaning blade is less than 0.2 or greater than 0.6.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific means for achieving the above-described object includes the following aspects.

According to an aspect of the present disclosure, there is provided an image forming apparatus including: an electrophotographic photoreceptor that includes a conductive substrate and a photosensitive layer disposed on the conductive substrate, and does not contain lubricant particles in a region of 30% from a surface of an outermost surface layer with respect to a film thickness of the outermost surface layer or contains 5% by mass or less of the lubricant particles with respect to an entirety of the region; a charging device that charges a surface of the electrophotographic photoreceptor; an electrostatic latent image forming device that forms an electrostatic latent image on the charged surface of the electrophotographic photoreceptor; a developing device that develops the electrostatic latent image formed on the surface of the electrophotographic photoreceptor with a developer containing an electrostatic charge image developing toner to form a toner image; a transfer device that transfers the toner image to a surface of a recording medium; and a cleaning device that has a cleaning blade and cleans the surface of the electrophotographic photoreceptor by bringing the cleaning blade into contact with the surface after the toner image is transferred by the transfer device, in which a dynamic friction coefficient in a contact portion between the electrophotographic photoreceptor and the cleaning blade is 0.2 or greater and 0.6 or less.

BRIEF DESCRIPTION OF THE DRAWINGS

Exemplary embodiment(s) of the present invention will be described in detail based on the following figures, wherein.

DETAILED DESCRIPTION

Figure 1:
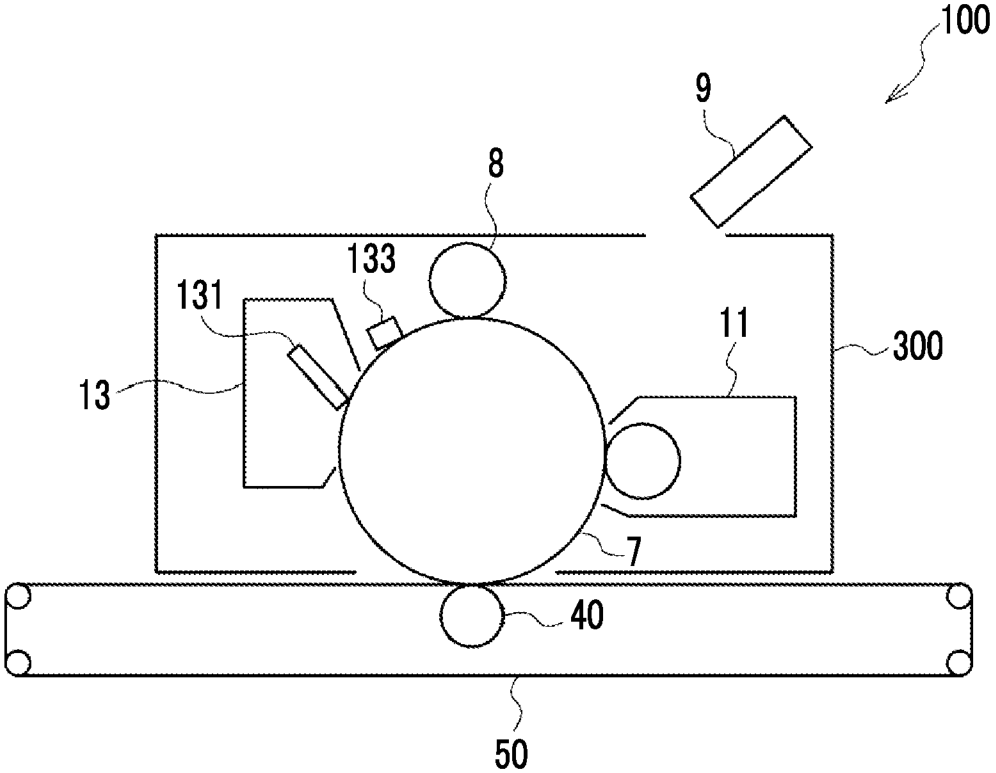
FIG. 1 is a schematic configuration view showing an example of an image forming apparatus according to the present exemplary embodiment.

Hereinafter, exemplary embodiments of the present disclosure will be described. The following descriptions and examples merely illustrate the exemplary embodiments, and do not limit the scope of the exemplary embodiments.

In the present disclosure, a numerical range shown using "to" indicates a range including numerical values described before and after "to" as a minimum value and a maximum value.

In a numerical range described in a stepwise manner in the present disclosure, an upper limit value or a lower limit value described in a certain numerical range may be replaced with an upper limit value or a lower limit value in another numerical range described in a stepwise manner. Further, in a numerical range described in the present disclosure, an upper limit value or a lower limit value described in the numerical range may be replaced with a value shown in Examples.

In the present disclosure, the meaning of the term "step" includes not only an independent step but also a step whose intended purpose is achieved even in a case where the step is not clearly distinguished from other steps.

In the present disclosure, in a case where an exemplary embodiment is described with reference to drawings, the configuration of the exemplary embodiment is not limited to the configuration shown in the drawings. In addition, the sizes of members in each drawing are conceptual, and a relative relation in the sizes between the members is not limited thereto.

In the present disclosure, each component may include a plurality of kinds of substances corresponding to each component. In the present disclosure, in a case where a plurality of kinds of substances corresponding to each component in a composition are present, the amount of each component in the composition indicates the total amount of the plurality of kinds of substances present in the composition unless otherwise specified.

In the present disclosure, each component may include a plurality of kinds of particles corresponding to each component. In a case where a plurality of kinds of particles corresponding to each component are present in a composition, the particle diameter of each component indicates the value of a mixture of the plurality of kinds of particles present in the composition, unless otherwise specified.

In the present disclosure, an alkyl group may be any of linear, branched, or cyclic unless otherwise specified.

In the present disclosure, a hydrogen atom in an organic group, an aromatic ring, a linking group, an alkyl group, an aryl group, an aralkyl group, an alkoxy group, or an aryloxy group may be substituted with a halogen atom.

Image Forming Apparatus

An image forming apparatus according to an exemplary embodiment of the present disclosure is an image forming apparatus including an electrophotographic photoreceptor that includes a conductive substrate and a photosensitive layer disposed on the conductive substrate, and does not contain lubricant particles in a region of 30% from a surface of an outermost surface layer with respect to a film thickness of the outermost surface layer or contains 5% by mass or less of the lubricant particles with respect to an entirety of the region, a charging device that charges a surface of the electrophotographic photoreceptor, an electrostatic latent image forming device that forms an electrostatic latent image on the charged surface of the electrophotographic photoreceptor, a developing device that develops the electrostatic latent image formed on the surface of the electrophotographic photoreceptor with a developer containing an electrostatic charge image developing toner to form a toner image, a transfer device that transfers the toner image to a surface of a recording medium, and a cleaning device that has a cleaning blade and cleans the surface of the electrophotographic photoreceptor by bringing the cleaning blade into contact with the surface after the toner image is transferred by the transfer device, in which a dynamic friction coefficient in a contact portion between the electrophotographic photoreceptor and the cleaning blade is 0.2 or greater and 0.6 or less.

Hereinafter, the electrophotographic photoreceptor will also be referred to as "photoreceptor", the region of 30% from the surface of the outermost surface layer with respect to the film thickness of the outermost surface layer will also be referred to as "outermost surface region", the electrostatic charge image developing toner will also be referred to as "toner", the cleaning blade will also be referred to as "blade", the contact portion of the blade with the photoreceptor will also be referred to as "blade tip portion", the contact portion between the photoreceptor and the blade will also be referred to as "cleaning portion", and the dynamic friction coefficient in the cleaning portion between the photoreceptor and the blade will also be referred to as "relative friction coefficient".

In an image forming apparatus in which the outermost surface region of the photoreceptor contains lubricant particles such as fluororesin particles, the friction coefficient of the entire surface of the photoreceptor is decreased, and the friction in the cleaning portion between the photoreceptor and the blade is suppressed by the lubricant particles scraped off by the blade.

Meanwhile, in recent years, it has been required not to use lubricant particles such as fluororesin particles. In an image forming apparatus including a photoreceptor in which the content of the lubricant particles in the outermost surface region is 5% by mass or less, the friction in the cleaning portion between the photoreceptor and the blade is likely to increase. In particular, in a low-humidity environment, the toner is unlikely to be supplied to the cleaning portion due to an increase in charging properties of the toner, and thus high friction is likely to occur in the cleaning portion. Further, in recent years, there is also a demand for cleaning the photoreceptor without applying a lubricant to the photoreceptor using a lubricant applying device or the like, and high friction is likely to occur in the cleaning portion in a case where a lubricant is not applied, as compared with a case where a lubricant is applied to the photoreceptor.

In a case where the friction in the cleaning portion between the photoreceptor and the blade increases, the behavior of the blade tip portion is likely to be destabilized, and accordingly, local turn-up of the blade tip portion is likely to occur. In a case where local turn-up of the blade tip portion occurs, streak-like image defects are likely to occur.

Here, as a method of suppressing high friction in the cleaning portion, a method of increasing the amount of a toner supplied to the cleaning portion can be considered. However, in a case where the amount of a toner to be supplied to the cleaning portion is increased, the amount of the toner consumed may increase, and the image quality of the non-image area may be degraded. Therefore, high friction in the cleaning portion is required to be suppressed without increasing the amount of the toner to be supplied to the cleaning portion.

On the contrary, in the present exemplary embodiment, the content of the lubricant particles in the outermost surface region of the photoreceptor is 5% by mass or less, and the relative friction coefficient in the cleaning portion is 0.2 or greater and 0.6 or less. Therefore, in the present exemplary embodiment, the behavior of the blade tip portion is likely to be stabilized without increasing the amount of the toner supplied to the cleaning portion and without applying a lubricant to the surface of the photoreceptor, and local turn-up of the blade tip portion is suppressed as compared with a case where the relative friction coefficient is greater than 0.6. In addition, occurrence of streak-like image defects due to cleaning failure accompanied by the above-described turn-up is also suppressed.

Further, in the present exemplary embodiment, the filming phenomenon of the photoreceptor caused by body contact of the blade tip portion with the surface of the photoreceptor is suppressed as compared with a case where the relative friction coefficient is less than 0.2. Here, the term "filming phenomenon" denotes a phenomenon in which the toner is crushed in the cleaning portion and adheres to the surface in a stretched state so that a thin film is formed. Hereinafter, the filming phenomenon on the surface of the photoreceptor is also referred to as "filming". For example, in a case where the relative friction coefficient is extremely small, since the amount of the blade tip portion to be drawn due to friction (also referred to as "tuck under") is decreased, the blade tip portion comes into contact with the surface of the photoreceptor in a state of body contact. In a case where the blade tip portion comes into contact with the photoreceptor in a state of body contact, the scraping force is decreased accompanied by a decrease in surface pressure of the blade tip portion, and filming is likely to occur due to cleaning failure. Meanwhile, in the present exemplary embodiment, since the relative friction coefficient is in the above-described range, the body contact is suppressed, and occurrence of filming due to cleaning failure accompanied by body contact is also suppressed.

For the above-described reason, in the present exemplary embodiment, both the streak-like image defects caused by local turn-up of the blade and the filming caused by body contact are suppressed without increasing the amount of the toner to be supplied to the cleaning portion and without applying a lubricant to the surface of the photoreceptor.

The image forming apparatus of the present exemplary embodiment includes at least a photoreceptor, a charging device, an electrostatic latent image forming device, a developing device, a transfer device, and a cleaning device and may also include other devices as necessary. Examples of the other devices include known devices applied to an image forming apparatus, such as a fixing device that fixes a toner image transferred to a surface of a recording medium, a charge erasing device that erases the charges on the surface of a photoreceptor by applying charge erasing light after the transfer of a toner image and before the charging, and an electrophotographic photoreceptor heating member that increases the temperature of the photoreceptor to decrease the relative temperature.

The image forming apparatus of the present exemplary embodiment is capable of suppressing both streak-like image defects caused by local turn-up of the cleaning blade and filming caused by body contact without applying a lubricant to the surface of the photoreceptor as described above. From the viewpoint of reducing the size of the device, it is preferable that the image forming apparatus of the present exemplary embodiment does not include, for example, a lubricant applying device that applies a lubricant to the surface of the photoreceptor.

The image forming apparatus according to the present exemplary embodiment may be a direct transfer type apparatus that directly transfers a toner image formed on the surface of the photoreceptor to a recording medium or an intermediate transfer type apparatus that primarily transfers the toner image formed on the surface of the photoreceptor to the surface of an intermediate transfer member and secondarily transfers the toner image transferred to the surface of the intermediate transfer member to the surface of the recording medium.

In a case of the intermediate transfer type apparatus, the transfer device is, for example, configured to include an intermediate transfer member having a surface onto which the toner image is transferred, a primary transfer device primarily transferring the toner image formed on the surface of the electrophotographic photoreceptor to the surface of the intermediate transfer member, and a secondary transfer device secondarily transferring the toner image transferred to the surface of the intermediate transfer member to the surface of the recording medium.

The image forming apparatus according to the present exemplary embodiment may be any of a dry development type image forming apparatus or a wet development type (development type using a liquid developer) image forming apparatus.

Further, in the image forming apparatus according to the present exemplary embodiment, for example, the portion including the electrophotographic photoreceptor and the cleaning device may have a cartridge structure (process cartridge) that is attachable to and detachable from the image forming apparatus. Further, the process cartridge may include, for example, at least one selected from the group consisting of a charging device, an electrostatic latent image forming device, a developing device, and a transfer device in addition to the electrophotographic photoreceptor and the cleaning device.

Hereinafter, an example of the image forming apparatus according to the present exemplary embodiment will be described, but the present exemplary embodiment is not limited thereto. Further, main parts shown in the figures will be described, but description of other parts will not be provided.

FIG. 1 is a schematic configuration view showing an example of the image forming apparatus according to the present exemplary embodiment.

As illustrated in FIG. 1, an image forming apparatus 100 according to the present exemplary embodiment includes a process cartridge 300 including an electrophotographic photoreceptor 7 (an example of an electrophotographic photoreceptor) and a cleaning device 13 (an example of a cleaning device), an exposure device 9 (an example of an electrostatic latent image forming device), a transfer device 40 (primary transfer device), and an intermediate transfer member 50. Further, in the image forming apparatus 100, the exposure device 9 is disposed at a position that can be exposed to the electrophotographic photoreceptor 7 from an opening portion of the process cartridge 300, the transfer device 40 is disposed at a position that faces the electrophotographic photoreceptor 7 via the intermediate transfer member 50, and the intermediate transfer member 50 is disposed such that a part of the intermediate transfer member 50 is in contact with the electrophotographic photoreceptor 7. Although not shown, the image forming apparatus also includes a secondary transfer device that transfers the toner image transferred to the intermediate transfer member 50 to a recording medium (for example, paper). Further, the intermediate transfer member 50, the transfer device 40 (primary transfer device), and the secondary transfer device (not shown) correspond to an example of the transfer device.

The process cartridge 300 in FIG. 1 integrally supports the electrophotographic photoreceptor 7, a charging device 8 (an example of the charging device), a developing device 11 (an example of the developing device), and the cleaning device 13 in a housing. The cleaning device 13 has a cleaning blade (an example of the cleaning member) 131, and the cleaning blade 131 is disposed to come into contact with the surface of the electrophotographic photoreceptor 7. As the cleaning member, a conductive or insulating fibrous member may be used in combination with the cleaning blade 131.

Further, FIG. 1 shows an example in which the image forming apparatus includes a fibrous member 133 (flat brush shape) that assists cleaning, but these members are disposed as necessary.

Figure 2:
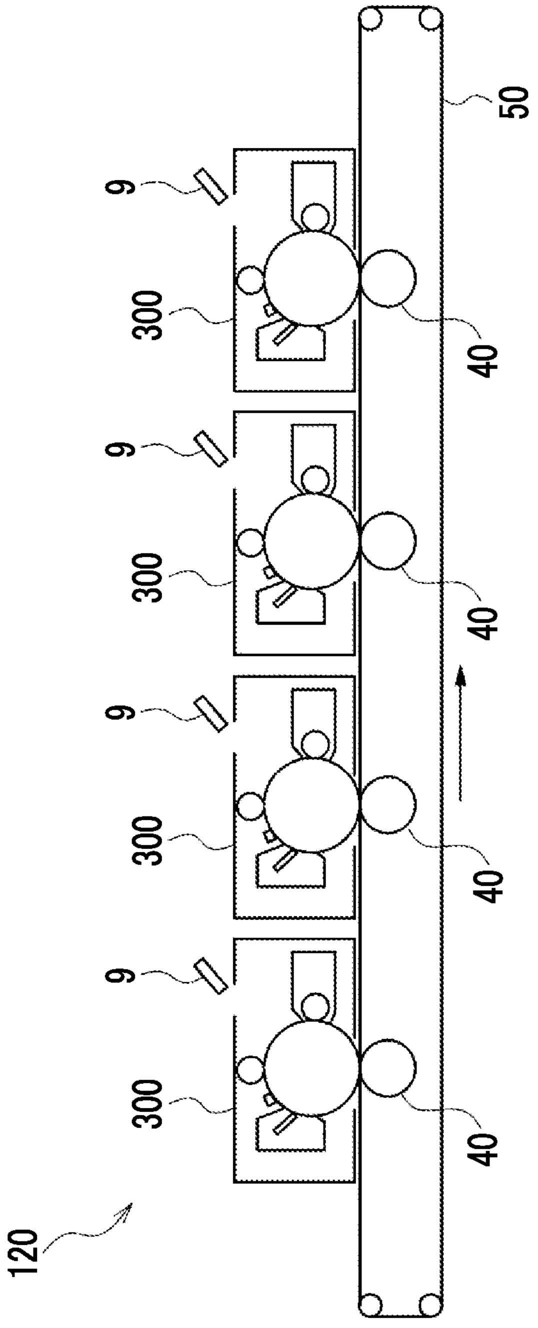
FIG. 2 is a schematic configuration view showing another example of the image forming apparatus according to the present exemplary embodiment.

FIG. 2 is a schematic configuration view showing another example of the image forming apparatus according to the present exemplary embodiment.

An image forming apparatus 120 shown in FIG. 2 is a tandem type multicolor image forming apparatus on which four process cartridges 300 are mounted. The image forming apparatus 120 is formed such that four process cartridges 300 are arranged in parallel on the intermediate transfer member 50, and one electrophotographic photoreceptor is used for each color. Further, the image forming apparatus 120 has the same configuration as the image forming apparatus 100 except that the image forming apparatus 120 is of a tandem type.

Hereinafter, each configuration and characteristics of the image forming apparatus according to the present exemplary embodiment will be described. Hereinafter, the reference numerals may be omitted.

Relative Friction Coefficient

The relative friction coefficient is a relative dynamic friction coefficient between the surface of the photoreceptor and the blade tip portion in a state where a toner, an external additive, and the like contained in the toner have not adhered to the surface.

The relative friction coefficient is measured, for example, by performing the following washing step using a photoreceptor in a state where a toner, an external additive, and the like have not adhered to the surface. Specifically, the adhesive materials on the surface of the photoreceptor are wiped off using ethanol. Thereafter, similarly, the adhesive materials on the surface of the photoreceptor are wiped off with pure water and, finally, wiped with a dry cloth.

Further, the relative friction coefficient may be measured by using, as a pseudo-photoreceptor, a flat plate in which a layer having the same composition as the composition of the outermost surface layer in the photoreceptor to be measured and having a thickness of 1.0 m or greater is formed on a substrate, in place of the photoreceptor.

The relative friction coefficient is measured using a HEIDON friction tester (manufactured by Shinto Scientific Co., Ltd.) in an environment of 22° C. and 55%. Specifically, a static load (normal force, NF) between the surface of the photoreceptor or the pseudo-photoreceptor and the blade is set to 1.0 N, and a set angle (blade set angle, BSA) between the surface of the photoreceptor or the pseudo-photoreceptor and the blade tip portion is set to 20°. Further, the relative friction coefficient is measured while the photoreceptor or the pseudo-photoreceptor moves in the same direction as the rotation direction of the photoreceptor at a speed of 100 mm/s.

The relative friction coefficient is 0.6 or less, and, for example, preferably 0.5 or less and more preferably 0.4 or less from the viewpoint of suppressing streak-like image defects caused by local turn-up of the blade. Further, the relative friction coefficient is 0.2 or greater and, for example, more preferably 0.2 or greater from the viewpoint of suppressing filming caused by body contact with the blade. The relative friction coefficient is 0.2 or greater and 0.6 or less and, for example, preferably 0.2 or greater and 0.5 or less and more preferably 0.2 or greater and 0.4 or less from a viewpoint of suppressing both streak-like image defects caused by local turn-up of the blade and filming caused by body contact.

Examples of the method of setting the relative friction coefficient to be in the above-described ranges include a method of adjusting the composition in the surface layer of the blade tip portion, a method of adjusting the conditions for forming the surface layer of the blade tip portion, a method of adjusting the composition in the base material of the blade, and a method of combining these methods. Here, the surface layer denotes a region up to 100 m from the surface of the blade tip portion.

Examples of the method of adjusting the composition in the surface layer of the blade tip portion include a method of allowing the surface layer to contain at least one polymer selected from the group consisting of a polymer having a siloxane bond and a polymer having a fluorine atom. Further, examples of the method of adjusting the composition in the surface layer of the blade tip portion in a case where the base material of the blade contains polyurethane rubber include a method of forming a cured layer impregnated with an isocyanate compound as the surface layer by modifying the polyurethane rubber.

Examples of the method of adjusting the conditions for forming the surface layer of the blade tip portion include a method of adjusting the drying temperature, the drying time, and the like of the coating solution used for forming the surface layer.

Examples of the method of adjusting the composition in the base material of the blade in a case where the base material contains polyurethane rubber include a method of adjusting the content of the polyisocyanate component in the polyurethane rubber.

Cleaning Device

The cleaning device is not particularly limited as long as the device is a device of a cleaning blade type provided with a cleaning blade.

Examples of the configuration of the cleaning device include a configuration in which a cleaning blade is fixed inside a cleaning case having an opening portion on the side of the photoreceptor serving as a member to be cleaned such that a blade tip portion is on the opening portion side, and a transporting member that guides, to a removed material recovery container, a removed material such as a waste toner recovered by the cleaning blade from the surface of the photoreceptor is provided.

Two or more cleaning blades may be used in the cleaning device. In a case where the cleaning device includes two or more cleaning blades, the relative friction coefficient of at least one of the two or more cleaning blades is in the above-described ranges, and for example, it is preferable that the relative friction coefficient of all the two or more cleaning blades is in the above-described ranges.

Cleaning Blade

The cleaning blade is not particularly limited as long as the relative friction coefficient is in the above-described ranges.

100% Modulus (M100)

The 100% modulus of the cleaning blade in the contact portion (that is, the blade tip portion) with the photoreceptor at 23° C. is, for example, preferably 8 MPa or greater and 23 MPa or less. Hereinafter, the 100% modulus of the blade tip portion at 23° C. will also be referred to as "M100".

In a case where the M100 is in the above-described ranges, streak-like image defects caused by local turn-up of the blade are suppressed as compared with a case where the M100 is less than the above-described ranges. The reason for this is not clear, but it is assumed that since the M100 is extremely low, high friction caused by an increase in the contact area of the cleaning portion is suppressed. From the viewpoint of suppressing streak-like image defects caused by local turn-up of the blade, the M100 is, for example, more preferably 10 MPa or greater and still more preferably 15 MPa or greater.

Further, in a case where the M100 is in the above-described range, filming caused by body contact of the blade is suppressed as compared with a case where the M100 is greater than the above-described ranges. The reason for this is not clear, but it is assumed that since the M100 is extremely high, body contact caused by a decrease in the amount (tuck under) of the blade tip portion to be drawn due to an increase in hardness of the blade tip portion is suppressed. From the viewpoint of suppressing filming caused by the body contact of the blade, the M100 is, for example, more preferably 20 MPa or less and still more preferably 18 MPa or less.

The M100 is a value acquired from a stress in a case of 100% strain by performing measurement at a tensile speed of 500 mm/min and 23° C. using a dumbbell-shaped No. 3 test piece in conformity with JIS K 6251 (2010). Further, for example, Strograph AE Elastomer (manufactured by Toyo Seiki Co., Ltd.) is used as a measuring device.

Examples of a method of setting the M100 to be in the above-described ranges include a method of adjusting the composition in the base material of the blade. Specific examples thereof include a method of adjusting the content of a polyisocyanate component in a case where the base material contains polyurethane rubber, a method of selecting at least one of the kind or the addition amount of a crosslinking agent in a case where a crosslinking agent is used for producing the base material, and a method of combining these methods. Further, the M100 increases as the content of the polyisocyanate component increases.

Impact Resilience

The impact resilience of the cleaning blade in the contact portion (that is, the blade tip portion) with the photoreceptor is, for example, preferably 15% or greater and 32% or less. Hereinafter, the impact resilience in the blade tip portion at 23° C. will also be simply referred to as "impact resilience".

In a case where the impact resilience is in the above-described ranges, streak-like image defects caused by local turn-up of the blade are suppressed as compared with a case where the impact resilience is greater than the above-described ranges. The reason for this is not clear, but it is assumed that occurrence of local turn-up caused by destabilization of the blade tip portion is suppressed because vibration of the blade tip portion which is likely to occur in a case where the impact resilience is extremely high is suppressed. From the viewpoint of suppressing streak-like image defects caused by local turn-up of the blade, the impact resilience is, for example, more preferably 30% or less and still more preferably 20% or less. Further, in a case where the impact resilience is in the above-described ranges, filming caused by body contact of the blade is suppressed as compared with a case where the impact resilience is less than the above-described ranges. The reason for this is not clear, but it is assumed that since the impact resilience is extremely low, a large collision energy is unlikely to be absorbed, and thus body contact occurring in a case where drawing of the blade tip portion is released is suppressed due to the influence of protrusions such as carriers adhering to the photoreceptor. From the viewpoint of suppressing filming caused by the body contact of the blade, the impact resilience is, for example, more preferably 14% or greater and still more preferably 16% or greater.

The impact resilience is a value acquired by using a LUPKE-type impact resilience tester in an environment of 23° C. in conformity with JIS K 6255 (1996).

Examples of the method of setting the impact resilience in the above-described ranges include a method of adjusting the composition of the base material of the blade. Specific examples thereof include a method of adjusting the content of a polyisocyanate component in a case where the base material contains polyurethane rubber, a method of selecting at least one of the kind or the addition amount of a crosslinking agent in a case where a crosslinking agent is used for producing the base material, and a method of combining these methods. Further, in a case where the content of the polyisocyanate component is increased, the impact resilience is decreased.

Material and Configuration

It is preferable that the cleaning blade includes, for example, a rubber elastic member. Examples of the rubber elastic member include polyurethane rubber, polyimide rubber, silicone rubber, fluororubber, propylene rubber, and butadiene rubber.

From the viewpoint of excellent abrasion resistance, mechanical strength, oil resistance, and ozone resistance, it is preferable that the cleaning blade contains, for example, polyurethane rubber.

Examples of the cleaning blade include a plate-like member.

The cleaning blade may have a single layer configuration, a configuration in which a modified layer formed by modifying a base material is provided as the surface layer, or a configuration in which a surface layer formed of a material different from the base material is provided as the surface layer. From the viewpoint of easily adjusting the relative friction coefficient, the M100, and the impact resilience to be in the above-described ranges, it is preferable that the cleaning blade includes, for example, a base material and at least a modified layer provided as the surface layer of the blade tip portion and formed by modifying the base material.

It is preferable that the cleaning blade contains, for example, at least one polymer selected from the group consisting of a polymer having a siloxane bond and a polymer having a fluorine atom in the surface layer of the blade tip portion. Hereinafter, at least one polymer selected from the group consisting of a polymer having a siloxane bond and a polymer having a fluorine atom will also be referred to as "specific polymer". In a case where the surface layer of the blade tip portion contains a specific polymer, the relative friction coefficient is likely to be adjusted to be in the above-described ranges, and both streak-like image defects caused by local turn-up of the blade and filming caused by body contact of the blade are likely to be suppressed.

Further, from the viewpoint of maintaining a state where the relative friction coefficient is adjusted to be in the above-described ranges, it is preferable that the specific polymer is, for example, an acrylic polymer. That is, it is preferable that the cleaning blade contains, for example, at least one polymer selected from the group consisting of an acrylic polymer having a siloxane bond and an acrylic polymer having a fluorine atom in the surface layer of the blade tip portion. In particular, in a case where the blade has a configuration in which a modified layer formed by modifying a base material is provided as a surface layer and the modified layer is a cured layer impregnated with an isocyanate compound described below, since the specific polymer is an acrylic polymer, the isocyanate compound and the specific polymer are likely to be chemically bonded to each other. Further, in a case where a modified layer in which the isocyanate compound and the specific polymer are chemically bonded to each other is provided as the surface layer, a state where the relative friction coefficient is adjusted to be in the above-described ranges is likely to be maintained.

Examples of the acrylic polymer having a siloxane bond include a block copolymer of (meth)acrylic acid ester and (meth)acrylic acid siloxane ester and a derivative thereof. Further, "(meth)acryl" denotes any one or both of acryl and methacryl.

Examples of the acrylic polymer having a fluorine atom include a block copolymer of (meth)acrylic acid ester and fluorinated alkyl (meth)acrylate and a derivative thereof.

Examples of a method of confirming that the surface layer of the blade tip portion contains the specific polymer and a method of confirming that the surface layer of the blade tip portion contains the specific polymer which is an acrylic polymer include the following methods. Specifically, the confirmation is made by estimating the structure and analyzing the composition of the surface layer material of the blade tip portion by an analysis method such as a Fourier transform infrared spectrophotometer (FTIR) or X-ray photoelectron spectroscopy (XPS).

Hereinafter, as an example of the cleaning blade, a blade in which the base material is formed of a polyurethane rubber member and a modified layer formed by modifying the base material is provided as the surface layer will be described.

Polyurethane Rubber Member

The polyurethane rubber member is a member containing polyurethane rubber as a main component. Here, the main component denotes a component that occupies 50% by mass or greater of the entire member. The content of the polyurethane rubber is, for example, preferably 80% by mass or greater, more preferably 90% by mass or greater, and still more preferably 95% by mass or greater with respect to the entire specific polyurethane rubber member.

Polyurethane Rubber

The polyurethane rubber is a polyurethane rubber obtained by polymerizing at least a polyol component and a polyisocyanate component. The polyurethane rubber may be, as necessary, polyurethane rubber obtained by polymerizing a resin containing a functional group capable of reacting with an isocyanate group of a polyisocyanate in addition to the polyol component.

It is preferable that the polyurethane rubber has, for example, a hard segment and a soft segment. The term "hard segment" denotes, among polyurethane rubber materials, a segment in which the material constituting the hard segment is relatively harder than the material constituting the soft segment, and the term "soft segment" denotes a segment in which the material constituting the soft segment is relatively softer than the material constituting the hard segment.

Examples of the material constituting the hard segment (hard segment material) include low-molecular-weight polyol components among polyol components and resins containing a functional group capable of reacting with an isocyanate group of a polyisocyanate. On the other hand, examples of the material constituting the soft segment (soft segment material) include high-molecular-weight polyol components among polyol components.

Polyol Component

The polyol component contains a high-molecular-weight polyol and a low-molecular-weight polyol.

The high-molecular-weight polyol component is a polyol having a number average molecular weight of 500 or greater (for example, preferably 500 or greater and 5,000 or less). Examples of the high-molecular-weight polyol component include known polyols such as a polyester polyol obtained by dehydration condensation of a low-molecular-weight polyol and a dibasic acid, a polycarbonate polyol obtained by a reaction between a low-molecular-weight polyol and an alkyl carbonate, a polycaprolactone polyol, and a polyether polyol. Examples of commercially available products of high-molecular-weight polyols include PLACCEL 205 and PLACCEL 240 manufactured by Daicel Corporation.

Here, the number average molecular weight is a value measured by a gel permeation chromatography (GPC) method. The same applies hereinafter.

These high-molecular-weight polyols may be used alone or in combination of two or more kinds thereof.

The polymerization ratio of the high-molecular-weight polyol component may be, for example, 59% by mass or greater and 68% by mass or less and is preferably 61% by mass or greater and 65% by mass or less with respect to the total polymerization components of the polyurethane rubber.

The low-molecular-weight polyol component is a polyol having a molecular weight (number average molecular weight) of less than 500. The low-molecular-weight polyol is a material that functions as a chain extender and a crosslinking agent.

Examples of the low-molecular-weight polyol component include 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,20-eicosanediol. Among these, 1,4-butanediol is used as the low-molecular-weight polyol component.

Examples of the low-molecular-weight polyol component include a diol (bifunctional), a triol (trifunctional), and a tetraol (tetrafunctional), which are known as chain extenders and crosslinking agents.

These polyols may be used alone or in combination of two or more kinds thereof.

The polymerization ratio of the low-molecular-weight polyol component may be, for example, 5% by mass or greater and 6% by mass or less and is preferably 5% by mass or greater and 5.5% by mass or less with respect to the total polymerization components of the polyurethane rubber.

Polyisocyanate Component

Examples of the polyisocyanate component include 4,4'-diphenylmethane diisocyanate (MDI), 2,6-toluene diisocyanate (TDI), 1,6-hexane diisocyanate (HDI), 1,5-naphthalene diisocyanate (NDI), and 3,3-dimethylbiphenyl-4,4'-diisocyanate (TODI).

As the polyisocyanate component, for example, 4,4'-diphenylmethane diisocyanate (MDI), 1,5-naphthalene diisocyanate (NDI), or hexamethylene diisocyanate (HDI) is more desirable.

These polyisocyanate components may be used alone or in combination of two or more kinds thereof.

The polymerization ratio of the polyisocyanate component may be, for example, 26% by mass or greater and 35% by mass or less and is preferably 30% by mass or greater and 35% by mass or less with respect to the total polymerization components of the polyurethane rubber.

Resin Containing Functional Group Capable of Reacting with Isocyanate Group

As the resin containing a functional group capable of reacting with an isocyanate group (hereinafter, referred to as "functional group-containing resin"), for example, a resin having flexibility is desirable, and an aliphatic resin having a linear structure is more desirable from the viewpoint of flexibility. Specific examples of the functional group-containing resin include an acrylic resin containing two or more hydroxyl groups, a polybutadiene resin containing two or more hydroxyl groups, and an epoxy resin containing two or more epoxy groups.

Examples of commercially available products of the acrylic resin containing two or more hydroxyl groups include ACTFLOW (grades: UMB-2005B, UMB-2005P, UMB-2005, UME-2005, and the like, manufactured by Soken Chemical & Engineering Co., Ltd.).

Examples of commercially available products of the polybutadiene resin containing two or more hydroxyl groups include R-45HT manufactured by Idemitsu Kosan Co., Ltd.

As the epoxy resin having two or more epoxy groups, for example, an epoxy resin is desirable which is not hard and brittle just as the general epoxy resins of the related art and is more flexible and tougher than the epoxy resin of the related art. As such an epoxy resin, for example, in view of molecular structure, an epoxy resin is preferable which has a structure (flexible skeleton) capable of improving mobility of the main chain in the main chain structure of the epoxy resin. Examples of the flexible skeleton include an alkylene skeleton, a cycloalkane skeleton, and a polyoxyalkylene skeleton. Among these, for example, a polyoxyalkylene skeleton is particularly preferable.

Further, for example, an epoxy resin having a low viscosity relative to the molecular weight is preferable to the epoxy resin of the related art in terms of the physical properties. Specifically, for example, the weight-average molecular weight is in a range of 900±100 and the viscosity at 25° C. is desirably in a range of 15,000±5,000 mPa s and more desirably in a range of 15,000±3,000 mPa s. Examples of commercially available products of the epoxy resin having the above-described characteristics include EPLICON EXA-4850-150 (manufactured by DIC Corporation).

The polymerization ratio of the functional group-containing resin may be, for example, within a range not impairing the characteristics of the cleaning blade.

Method of Producing Polyurethane Rubber

The polyurethane rubber is produced by using a typical method of producing polyurethane such as a prepolymer method or a one-shot method. The prepolymer method is preferable for the present exemplary embodiment from the viewpoint of obtaining polyurethane having excellent abrasion resistance and excellent chipping resistance, but the production method is not limited thereto.

The cleaning blade is prepared by forming a composition for forming a cleaning blade prepared by the above method into a sheet by using, for example, centrifugal molding, extrusion molding, or the like and processing the sheet by cutting or the like.

Examples of the catalyst used for producing the polyurethane rubber include an amine-based compound such as a tertiary amine, a quaternary ammonium salt, and an organometallic compound such as an organic tin compound.

Examples of the tertiary amine include trialkylamine such as triethylamine, tetraalkyl diamine such as N,N,N',N'-tetramethyl-1,3-butanediamine, aminoalcohol such as dimethylethanolamine, esteramine such as ethoxylated amine, ethoxylated diamine, or bis(diethylethanolamine)adipate, a cyclohexylamine derivative such as triethylenediamine (TEDA) or N,N-dimethylcyclohexylamine, a morpholine derivative such as N-methylmorpholine or N-(2-hydroxypropyl)-dimethylmorpholine, and a piperazine derivative such as N,N'-diethyl-2-methylpiperazine or N,N'-bis-(2-hydroxypropyl)-2-methylpiperazine.

Examples of the quaternary ammonium salt include 2-hydroxypropyltrimethylammonium octylate, 1,5-diazabicyclo[4.3.0]nonen-5(DBN) octylate, 1,8-diazabicyclo[5.4.0]undec-7(DBU)-octylate, DBU-oleate, DBU-p-toluenesulfonate, DBU-formate, and 2-hydroxypropyltrimethylammonium formate.

Examples of the organic tin compound include a dialkyltin compound such as dibutyltin dilaurate or dibutyltin di(2-ethylhexoate), stannous 2-ethylcaproate, and stannous oleate.

Among these catalysts, triethylenediamine (TEDA) of a tertiary ammonium salt is used in terms of hydrolysis resistance, and a quaternary ammonium salt is used in terms of workability. Among the quaternary ammonium salts, 1,5-diazabicyclo[4.3.0]nonen-5 (DBN) octylate, 1,8-diazabicyclo[5.4.0]undec-7(DBU)-octylate, or DBU-formate with high reaction activity is used.

The content of the catalyst is, for example, preferably in a range of 0.0005% by mass or greater and 0.03% by mass or less and particularly preferably 0.001% by mass or greater and 0.01% by mass or less of the entire polyurethane rubber constituting the contact member.

These may be used alone or in combination of two or more kinds thereof.

Modified Layer

It is preferable that the cleaning blade includes, for example, a cured layer impregnated with a specific polymer and an isocyanate compound which is a modified layer formed by modifying the base material, as the surface layer of the polyurethane rubber member constituting the base material. Hereinafter, the cured layer impregnated with an isocyanate compound and a specific polymer will also be simply referred to as "impregnated cured layer".

In a case where the cleaning blade includes the impregnated cured layer, the relative friction coefficient, the M100, and the impact resilience are likely to be adjusted to be in the above-described ranges.

The impregnated cured layer is a layer obtained by impregnating the surface layer of an elastic layer with a surface treatment liquid containing an isocyanate compound, a specific polymer, and an organic solvent and curing the surface treatment liquid (that is, the isocyanate compound and the specific polymer).

The impregnated cured layer is formed as a layer integrated with the surface layer of the contact portion such that the density of the layer gradually decreases toward the inside from the surface.

Examples of the isocyanate compound include 2,6-tolylene diisocyanate (TDI), 4,4'-diphenylmethane diisocyanate (MDI), paraphenylenediisocyanate (PPDI), 1,5-naphthalene diisocyanate (NDI), 3,3'-dimethyldiphenyl-4,4'-diisocyanate (TODI), and multimers and modified products of these. Examples of the modified product of the isocyanate compound include a urethane prepolymer in which an isocyanate compound is prepolymerized together with a polyol.

As the specific polymer, for example, a compound that reacts with and is chemically bonded to an isocyanate compound is preferable, and specific examples thereof include the acrylic polymer having a siloxane bond and the acrylic polymer having a fluorine atom described above. Further, from the viewpoint of the solubility in an organic solvent, for example, a compound containing a hydroxyl group, an alkyl group, or a carboxyl group is preferable as the specific polymer.

The content of the specific polymer in the surface treatment liquid may be 8 parts by mass or greater and 13 parts by mass or less with respect to 100 parts by mass of the isocyanate compound, and from the viewpoint of setting the relative friction coefficient to be in the above-described ranges, the content of the specific polymer is set to, for example, preferably 9 parts by mass or greater and 13 parts by mass or less and more preferably 10 parts by mass or greater and 13 parts by mass or less.

As the organic solvent, for example, an organic solvent that dissolves a specific polymer and is compatible with an isocyanate compound is preferable, and specific examples thereof include ethyl acetate, methyl ethyl ketone (MEK), toluene, acetone, and cyclohexanone. Further, as the organic solvent, a reactive diluent such as 2-hydroxyethyl acrylate, tetrahydrofurfuryl acrylate, 2-hydroxyethyl methacrylate, hydroxypropyl methacrylate, glycidyl methacrylate, neopentyl glycol diacrylate, hexanediol diacrylate, or trimethylolpropane triacrylate may be used.

The impregnated cured layer is formed, for example, by impregnating and coating at least the tip portion of the base material with the surface treatment liquid, drying the tip portion so that the organic solvent is removed, and performing a heat treatment.

An impregnating and coating method is not particularly limited, and examples thereof include typical methods such as a blade coating method, a wire bar coating method, a spray coating method, a dip coating method, a bead coating method, an air knife coating method, and a curtain coating method. In a case where the impregnating and coating method is a dip coating method, the dipping time may be, for example, in a range of 10 seconds or longer and 60 seconds or shorter.

After the impregnating and coating of the tip portion, the tip portion may be dried, for example, under conditions of a temperature of 20° C. or higher and 30° C. or lower for 1 minute or longer and 10 minutes or shorter. The heat treatment may be performed, for example, under conditions of a temperature of 50° C. or higher and 80° C. or lower for 60 minutes or longer and 90 minutes or shorter.

Electrophotographic Photoreceptor

The electrophotographic photoreceptor is not particularly limited as long as the content of the lubricant particles in the outermost surface region is 5% by mass or less.

Lubricant Particles

The content of the lubricant particles in the outermost surface region may be 5% by mass or less, 3% by mass or less or 1% by mass or less, and the outermost surface region may not contain the lubricant particles.

Examples of the lubricant particles include fluororesin particles and fatty acid metal salt particles.

Examples of the fluororesin particles include particles of a fluororesin such as polytetrafluoroethylene (PTFE), a perfluoroalkoxy fluororesin, polychlorotrifluoroethylene, polyvinylidene fluoride, polydichlorodifluoroethylene, a tetrafluoroethylene-perfluoroalkyl vinyl ether copolymer, a tetrafluoroethylene-hexafluoropropylene copolymer, a tetrafluoroethylene-ethylene copolymer, a tetrafluoroethylene-hexafluoropropylene-perfluoroalkyl vinyl ether copolymer, and a tetrafluoroethylene-perfluoroalkoxy ethylene copolymer.

Examples of the fatty acid metal salt particles include particles of fatty acid metal salts such as a metal salt of stearic acid, a metal salt of palmitic acid, a metal salt of lauric acid, a metal salt of oleic acid, a metal salt of linoleic acid, and a metal salt of ricinoleic acid.

The content of the lubricant particles in the outermost surface region is measured as follows.

Specifically, first, a cross section of the photosensitive layer is observed using a FIB-SEM or the like to confirm whether or not the outermost surface region contains lubricating fine particles. Subsequently, in a case where the outermost surface region contains lubricating fine particles, the content of the lubricating fine particles is quantified.

In a case of a layered material containing lubricating fine particles, the layered material is immersed in a solvent (for example, tetrahydrofuran), and the lubricating fine particles and a substance insoluble in a solvent are dissolved in a solvent (for example, tetrahydrofuran), and the solvent is added dropwise to pure water to filter the precipitate. The solution containing the lubricating fine particles obtained here is collected. Further, the insoluble material obtained by the filtration is dissolved in a solvent, and the solvent is added dropwise to pure water to filter the precipitate. The operation of collecting the solution containing the lubricating fine particles obtained here is repeated 5 times, and the aqueous solution collected by all the operations is defined as a pretreated aqueous solution.

For example, in a case of a composition containing dispersant-attached polytetrafluoroethylene particles, the composition is treated in the same manner as in the case of the layered material, thereby obtaining a pretreated aqueous solution. In a case of dispersant-attached PTFE particles, the dispersant-attached PTFE particles are treated in the same manner as in the case of the layered material, thereby obtaining a pretreated aqueous solution.

The pretreated aqueous solution obtained by the above-described method is used to adjust a sample solution and to perform measurement in conformity with the method described in "Analysis of perfluorooctanesulfonic acid (PFOS) of perfluorooctane and perfluorooctanoic acid (PFOA) of perfluorooctane in environmental water, bottom sediment, and organism, the Research Institute for Environmental Science and Public Health of Iwate Prefecture".

Breaking Energy

From the viewpoint of improving the durability of the photoreceptor, the breaking energy of the outermost surface layer is, for example, preferably 8.0 $mJ/mm^3$ or greater, more preferably 10 $mJ/mm^3$ or greater, and still more preferably 15 $mJ/mm^3$ or greater. The surface of the photoreceptor in which the breaking energy of the outermost surface layer is in the above-described ranges is likely to have high friction. However, in the present exemplary embodiment, since the relative friction coefficient is in the above-described ranges, both the streak-like image defects caused by local turn-up of the blade and filming caused by body contact are suppressed even in a case where the breaking energy of the outermost surface layer is in the above-described ranges.

From the viewpoint that the abrasion resistance is degraded due to tough fracture, the breaking energy of the outermost surface layer is, for example, preferably 30 $mJ/mm^3$ or less, more preferably 28 $mJ/mm^3$ or less, and still more preferably 25 $mJ/mm^3$ or less.

The breaking energy is a value acquired by performing the following measurement at 23° C. Specifically, the breaking energy is measured with a sample of the outermost surface layer cut into a width of 5 mm and a length of 25 mm using a tensile tester MODEL-1605N (manufactured by Aikoh Engineering Co., Ltd.) under conditions of a load cell with a rated load of 5 kgf and a tensile speed of 20 mm/min.

Examples of the photoreceptor in which the breaking energy of the outermost surface layer is in the above-described range include a photoreceptor in which the outermost surface layer contains at least one selected from the group consisting of a polyester resin and a polycarbonate resin.

From the viewpoint of setting the breaking energy of the outermost surface layer to be in the above-described ranges, it is preferable that the photoreceptor contains, for example, at least one selected from the group consisting of a polyester resin and a polycarbonate resin in at least the outermost surface region of the outermost surface layer.

The outermost surface layer contains, for example, more preferably at least one selected from the group consisting of a polyester resin having an aromatic ring and a polycarbonate resin having an aromatic ring and still more preferably at least one selected from the group consisting of a polyester resin that has a constitutional unit having an aromatic ring and a polycarbonate resin that has a constitutional unit having an aromatic ring.

Hereinafter, the polyester resin that has a constitutional unit having an aromatic ring and the polycarbonate resin that has a constitutional unit having an aromatic ring will be described.

Polyester Resin That Has Constitutional Unit Having Aromatic Ring

As the polyester resin that has a constitutional unit having an aromatic ring, for example, a polyester resin (1) having at least a dicarboxylic acid unit (A) and a diol unit (B) is preferable. The polyester resin (1) may have other dicarboxylic acid units in addition to the dicarboxylic acid unit (A). The polyester resin (1) may have other diol units in addition to the diol unit (B).

The dicarboxylic acid unit (A) is a constitutional unit represented by Formula (A).

Formula (A)

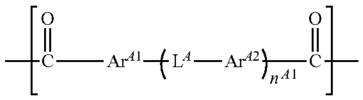

In Formula (A), $Ar^{A1}$ and $Ar^{A2}$ each independently represent an aromatic ring that may have a substituent, $L^{A}$ represents a single bond or a divalent linking group, and $n^{A1}$ represents 0, 1, or 2.

The aromatic ring as $Ar^{A1}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{A1}$ may be substituted with an alkyl group, an aryl group, an aralkyl group, an alkoxy group, an aryloxy group, a halogen atom, or the like. As the substituent in a case where the aromatic ring as $Ar^{A1}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

The aromatic ring of $Ar^{A2}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{A2}$ may be substituted with an alkyl group, an aryl group, an aralkyl group, an alkoxy group, an aryloxy group, a halogen atom, or the like. As the substituent in a case where the aromatic ring as $Ar^{A2}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

In a case where $L^{A}$ represents a divalent linking group, examples of the divalent linking group include an oxygen atom, a sulfur atom, and —C($Ra^1$)($Ra^2$)—. Here, $Ra^1$ and $Ra^2$ each independently represent a hydrogen atom, an alkyl group having 1 or more and 10 or less carbon atoms, an aryl group having 6 or more and 12 or less carbon atoms, or an aralkyl group having 7 or more and 20 or less carbon atoms, and $Ra^1$ and $Ra^2$ may be bonded to each other to form a cyclic alkyl group.

The alkyl group having 1 or more and 10 or less carbon atoms as $Ra^1$ and $Ra^2$ may be any of linear, branched, or cyclic. The number of carbon atoms of the alkyl group is, for example, preferably 1 or more and 6 or less, more preferably 1 or more and 4 or less, and still more preferably 1 or 2.

The aryl group having 6 or more and 12 or less carbon atoms as $Ra^1$ and $Ra^2$ may be any of a monocycle or a polycycle. The number of carbon atoms of the aryl group is, for example, preferably 6 or more and 10 or less and more preferably 6.

The alkyl group in the aralkyl group having 7 or more and 20 or less carbon atoms as $Ra^1$ and $Ra^2$ may be any of linear, branched, or cyclic. The number of carbon atoms of the alkyl group in the aralkyl group having 7 or more and 20 or less carbon atoms is, for example, preferably 1 or more and 4 or less, more preferably 1 or more and 3 or less, and still more preferably 1 or 2.

The aryl group in the aralkyl group having 7 or more and 20 or less carbon atoms as $Ra^1$ and $Ra^2$ may be any of a monocycle or a polycycle. The number of carbon atoms of the aryl group is, for example, preferably 6 or more and 10 or less and more preferably 6.

It is preferable that the dicarboxylic acid unit (A) includes, for example, at least one selected from the group consisting of a dicarboxylic acid unit (A1) represented by Formula (A1), a dicarboxylic acid unit (A2) represented by Formula (A2), a dicarboxylic acid unit (A3) represented by Formula (A3), and a dicarboxylic acid unit (A4) represented Formula (A4).

Formula (A1)

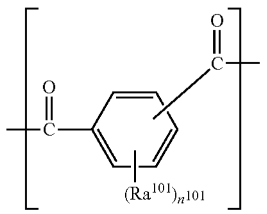

In Formula (A1), $n^{101}$ represents an integer of 0 or greater and 4 or less, and $n^{101}$ pieces of $Ra^{101}$'s each independently represent an alkyl group having 1 or more and 10 or less carbon atoms, an aryl group having 6 or more and 12 or less carbon atoms, or an alkoxy group having 1 or more and 6 or less carbon atoms.

$n^{101}$ represents, for example, preferably 0, 1, or 2, more preferably 0 or 1, and still more preferably 0.

Formula (A2)

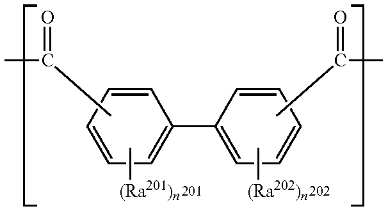

In Formula (A2), $n^{201}$ and $n^{202}$ each independently represent an integer of 0 or greater and 4 or less, and $n^{201}$ pieces of $Ra^{201}$'s and $n^{202}$ pieces of $Ra^{202}$'s each independently represent an alkyl group having 1 or more and 10 or less carbon atoms, an aryl group having 6 or more and 12 or less carbon atoms, or an alkoxy group having 1 or more and 6 or less carbon atoms.

$n^{201}$ represents, for example, preferably 0, 1, or 2, more preferably 0 or 1, and still more preferably 0.

$n^{202}$ represents, for example, preferably 0, 1, or 2, more preferably 0 or 1, and still more preferably 0.

Formula (A3)

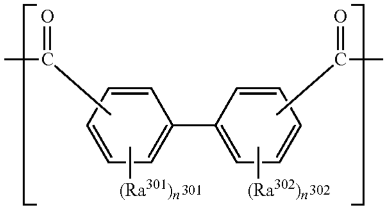

In Formula (A3), $n^{301}$ and $n^{302}$ each independently represent an integer of 0 or greater and 4 or less, and $n^{301}$ pieces of $Ra^{301}$'s and $n^{302}$ pieces of $Ra^{302}$'s each independently represent an alkyl group having 1 or more and 10 or less carbon atoms, an aryl group having 6 or more and 12 or less carbon atoms, or an alkoxy group having 1 or more and 6 or less carbon atoms.

$n^{301}$ represents, for example, preferably 0, 1, or 2, more preferably 0 or 1, and still more preferably 0.

$n^{302}$ represents, for example, preferably 0, 1, or 2, more preferably 0 or 1, and still more preferably 0.

Formula (A4)

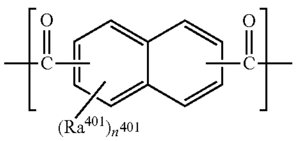

In Formula (A4), $n^{401}$ represents an integer of 0 or greater and 6 or less, and $n^{401}$ pieces of $Ra^{401}$'s each independently represent an alkyl group having 1 or more and 10 or less carbon atoms, an aryl group having 6 or more and 12 or less carbon atoms, or an alkoxy group having 1 or more and 6 or less carbon atoms.

$n^{401}$ represents, for example, preferably an integer of 0 or greater and 4 or less, more preferably 0, 1, or 2, and still more preferably 0.

Hereinafter, dicarboxylic acid units (A1-1) to (A1-9) are shown as specific examples of the dicarboxylic acid unit (A1). The dicarboxylic acid unit (A1) is not limited thereto.

(A1-1)

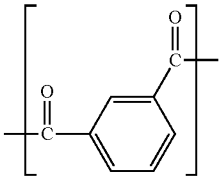

(A1-2)

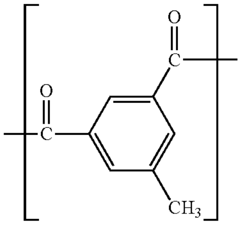

(A1-3)

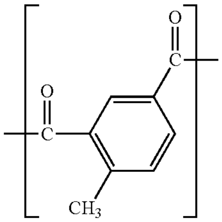

(A1-4)

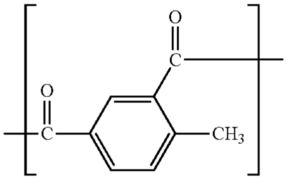

(A1-5)

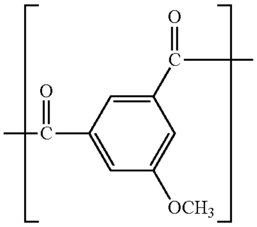

(A1-6)

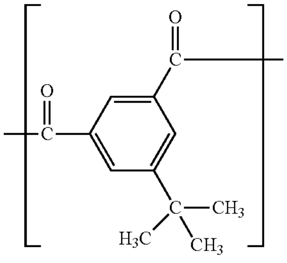

(A1-7)

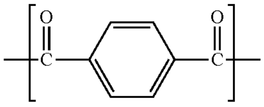

-continued (A1-8)

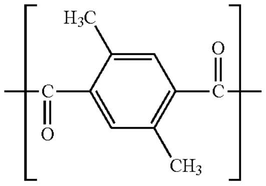

(A1-9)

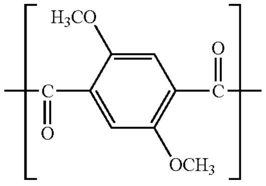

Hereinafter, dicarboxylic acid units (A2-1) to (A2-3) are shown as specific examples of the dicarboxylic acid unit (A2). The dicarboxylic acid unit (A2) is not limited thereto.

(A2-1)

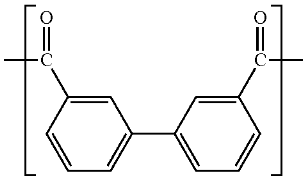

(A2-2)

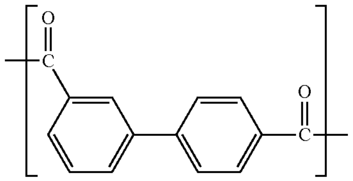

(A2-3)

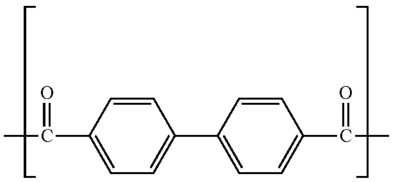

Hereinafter, dicarboxylic acid units (A3-1) and (A3-2) are shown as specific examples of the dicarboxylic acid unit (A3). The dicarboxylic acid unit (A3) is not limited thereto.

(A3-1)

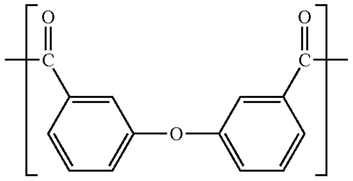

(A3-2)

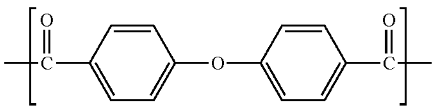

Hereinafter, dicarboxylic acid units (A4-1) to (A4-3) are shown as specific examples of the dicarboxylic acid unit (A4). The dicarboxylic acid unit (A4) is not limited thereto.

(A4-1)

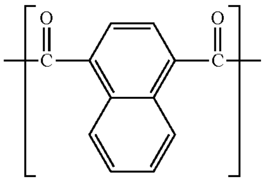

(A4-2)

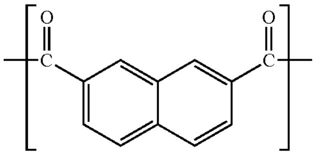

(A4-3)

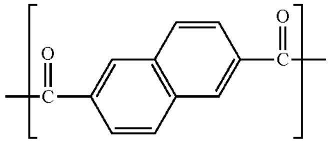

As the dicarboxylic acid unit (A), for example, (A1-1), (A1-7), (A2-3), (A3-2), and (A4-3) in the specific examples shown above are preferable, and (A2-3) is most preferable.

The total mass proportion of the dicarboxylic acid units (A1) to (A4) in the polyester resin (1) is, for example, preferably 15% by mass or greater and 60% by mass or less. In a case where the total mass proportion of the dicarboxylic acid units (A1) to (A4) is 15% by mass or greater, the abrasion resistance of the photosensitive layer is enhanced. From this viewpoint, the total mass proportion of the dicarboxylic acid units (A1) to (A4) is, for example, more preferably 20% by mass or greater and still more preferably 25% by mass or greater.

In a case where the total mass proportion of the dicarboxylic acid units (A1) to (A4) is 60% by mass or less, peeling of the photosensitive layer can be suppressed. From this viewpoint, the total mass proportion of the dicarboxylic acid units (A1) to (A4) is, for example, more preferably 55% by mass or less and still more preferably 50% by mass or less.

The dicarboxylic acid units (A1) to (A4) contained in the polyester resin (1) may be used alone or in combination of two or more kinds thereof.

The diol unit (B) is a constitutional unit represented by Formula (B).

Formula (B)

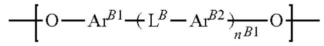

In Formula (B), $Ar^{B1}$ and $Ar^{B2}$ each independently represent an aromatic ring that may have a substituent, $L^B$ represents a single bond, an oxygen atom, a sulfur atom, or $-C(Rb^1)(Rb^2)-$, and $n^{B1}$ represents 0, 1, or 2, and $Rb^1$ and $Rb^2$ each independently represent a hydrogen atom, an alkyl group having 1 or more and 20 or less carbon atoms, an aryl group having 6 or more and 12 or less carbon atoms, or an aralkyl group having 7 or more and 20 or less carbon atoms, and $Rb^1$ and $Rb^2$ may be bonded to each other to form a cyclic alkyl group.

The aromatic ring as $Ar^{B1}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{B1}$ may be substituted with an alkyl group, an aryl group, an aralkyl group, an alkoxy group, an aryloxy group, a halogen atom, or the like. As the substituent in a case where the aromatic ring as $Ar^{B1}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

The aromatic ring as $Ar^{B2}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{B2}$ may be substituted with an alkyl group, an aryl group, an aralkyl group, an alkoxy group, an aryloxy group, a halogen atom, or the like. As the substituent in a case where the aromatic ring as $Ar^{B2}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

The alkyl group having 1 or more and 20 or less carbon atoms as $Rb^1$ and $Rb^2$ may be linear, branched, or cyclic. The number of carbon atoms of the alkyl group is, for example, preferably 1 or more and 18 or less, more preferably 1 or more and 14 or less, and still more preferably 1 or more and 10 or less.

The aryl group having 6 or more and 12 or less carbon atoms as $Rb^1$ and $Rb^2$ may be any of a monocycle or a polycycle. The number of carbon atoms of the aryl group is, for example, preferably 6 or more and 10 or less and more preferably 6.

The alkyl group in the aralkyl group having 7 or more and 20 or less carbon atoms as $Rb^1$ and $Rb^2$ may be any of linear, branched, or cyclic. The number of carbon atoms of the alkyl group in the aralkyl group having 7 or more and 20 or less carbon atoms is, for example, preferably 1 or more and 4 or less, more preferably 1 or more and 3 or less, and still more preferably 1 or 2.

The aryl group in the aralkyl group having 7 or more and 20 or less carbon atoms as $Rb^1$ and $Rb^2$ may be any of a monocycle or a polycycle. The number of carbon atoms of the aryl group is, for example, preferably 6 or more and 10 or less and more preferably 6.

It is preferable that the diol unit (B) includes, for example, at least one selected from the group consisting of a diol unit (B1) represented by Formula (B1), a diol unit (B2) represented by Formula (B2), a diol unit (B3) represented by Formula (B3), a diol unit (B4) represented by Formula (B4), a diol unit (B5) represented by Formula (B5), a diol unit (B6) represented by Formula (B6), a diol unit (B7) represented by Formula (B7), and a diol unit (B8) represented by Formula (B8).

Formula (B1)

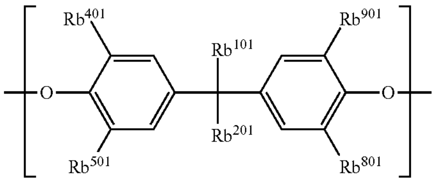

In Formula (B1), $Rb^{101}$ represents a branched alkyl group having 4 or more and 20 or less carbon atoms, $Rb^{201}$ represents a hydrogen atom or an alkyl group having 1 or more and 3 or less carbon atoms, and $Rb^{401}$, $Rb^{501}$, $Rb^{801}$, and $Rb^{901}$ each independently represent a hydrogen atom, an alkyl group having 1 or more and 4 or less carbon atoms, an alkoxy group having 1 or more and 6 or less carbon atoms, or a halogen atom.

Formula (B2)

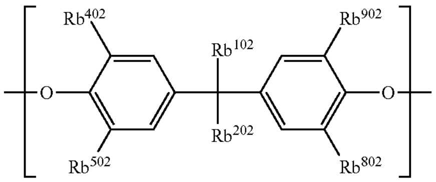

In Formula (B2), $Rb^{102}$ represents a linear alkyl group having 4 or more and 20 or less carbon atoms, $Rb^{202}$ represents a hydrogen atom or an alkyl group having 1 or more and 3 or less carbon atoms, and $Rb^{402}$, $Rb^{502}$, $Rb^{802}$, and $Rb^{902}$ each independently represent a hydrogen atom, an alkyl group having 1 or more and 4 or less carbon atoms, an alkoxy group having 1 or more and 6 or less carbon atoms, or a halogen atom.

Formula (B3)

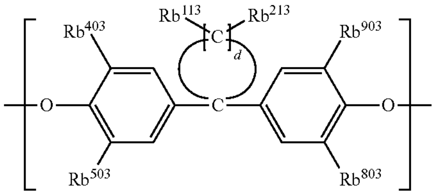

In Formula (B3), $Rb^{113}$ and $Rb^{213}$ each independently represent a hydrogen atom, a linear alkyl group having 1 or more and 3 or less carbon atoms, an alkoxy group having 1 or more and 4 or less carbon atoms, or a halogen atom, d represents an integer of 7 or greater and 15 or less, and $Rb^{403}$, $Rb^{503}$, $Rb^{803}$, and $Rb^{903}$ each independently represent a hydrogen atom, an alkyl group having 1 or more and 4 or less carbon atoms, an alkoxy group having 1 or more and 6 or less carbon atoms, or a halogen atom.

Formula (B4)

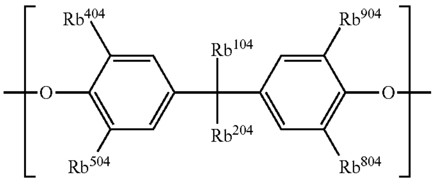

In Formula (B4), $Rb^{104}$ and $Rb^{204}$ each independently represent a hydrogen atom, an alkyl group having 1 or more and 3 or less carbon atoms, and $Rb^{404}$, $Rb^{504}$, $Rb^{804}$, and $Rb^{904}$ each independently represent a hydrogen atom, an alkyl group having 1 or more and 4 or less carbon atoms, an alkoxy group having 1 or more and 6 or less carbon atoms, or a halogen atom.

Formula (B5)

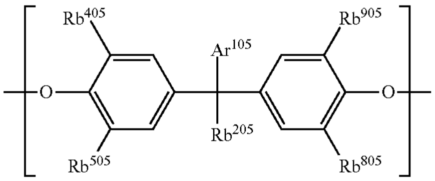

In Formula (B5), $Ar^{105}$ represents an aryl group having 6 or more and 12 or less carbon atoms or an aralkyl group having 7 or more and 20 or less carbon atoms, $Rb^{205}$ represents a hydrogen atom or an alkyl group having 1 or more and 3 or less carbon atoms, and $Rb^{405}$, $Rb^{505}$, $Rb^{805}$, and $Rb^{905}$ each independently represent a hydrogen atom, an alkyl group having 1 or more and 4 or less carbon atoms, an alkoxy group having 1 or more and 6 or less carbon atoms, or a halogen atom.

Formula (B6)

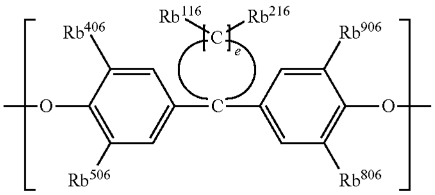

In Formula (B6), $Rb^{116}$ and $Rb^{216}$ each independently represent a hydrogen atom, a linear alkyl group having 1 or more and 3 or less carbon atoms, an alkoxy group having 1 or more and 4 or less carbon atoms, or a halogen atom, e represents an integer of 4 or greater and 6 or less, and $Rb^{406}$, $Rb^{506}$, $Rb^{806}$, and $Rb^{906}$ each independently represent a hydrogen atom, an alkyl group having 1 or more and 4 or less carbon atoms, an alkoxy group having 1 or more and 6 or less carbon atoms, or a halogen atom.

Formula (B7)

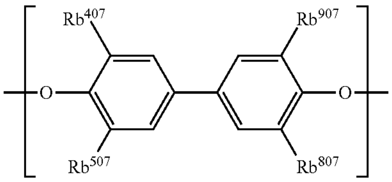

In Formula (B7), $Rb^{407}$, $Rb^{507}$, $Rb^{807}$, and $Rb^{907}$ each independently represent a hydrogen atom, an alkyl group having 1 or more and 4 or less carbon atoms, an alkoxy group having 1 or more and 6 or less carbon atoms, or a halogen atom.

Formula (B8)

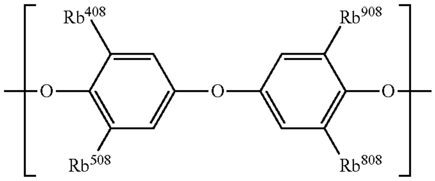

In Formula (B8), $Rb^{408}$, $Rb^{508}$, $Rb^{808}$, and $Rb^{908}$ each independently represent a hydrogen atom, an alkyl group having 1 or more and 4 or less carbon atoms, an alkoxy group having 1 or more and 6 or less carbon atoms, or a halogen atom.

Hereinafter, diol units (B1-1) to (B1-6) are shown as specific examples of the diol unit (B1). The diol unit (B1) is not limited thereto.

(B1-1)

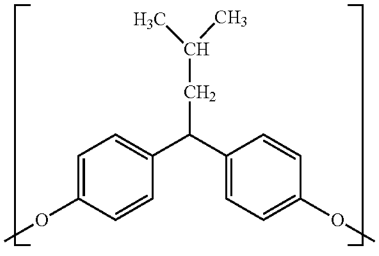

(B1-2)

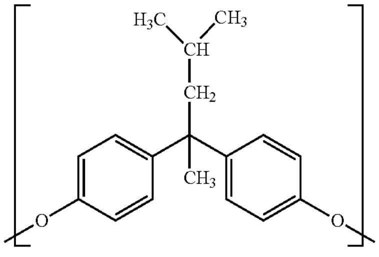

-continued
(B1-3)
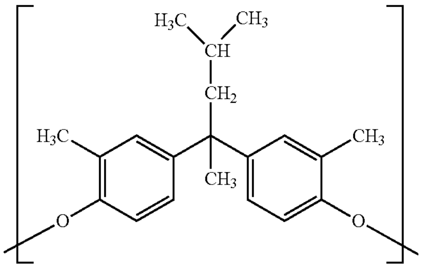
(B1-4)
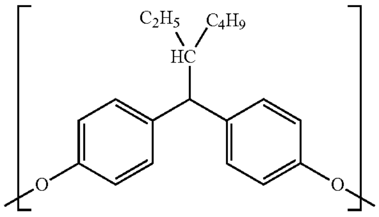
(B1-5)
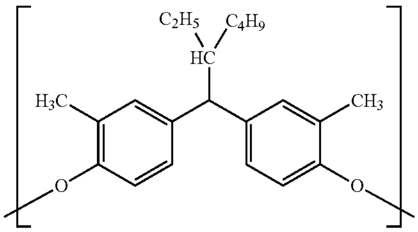
(B1-6)
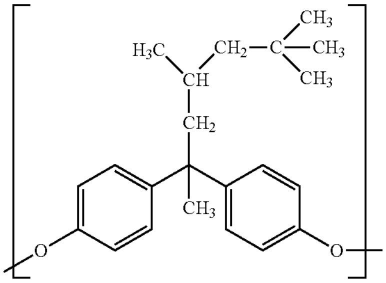
Hereinafter, diol units (B2-1) to (B2-11) are shown as specific examples of the diol unit (B2). The diol unit (B2) is not limited thereto.
(B2-1)
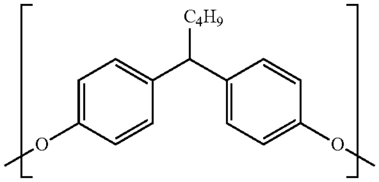
(B2-2)
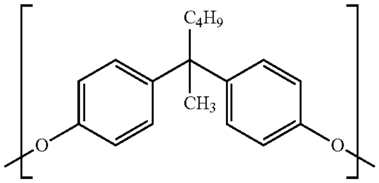
-continued
(B2-3)
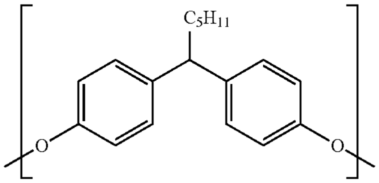
(B2-4)
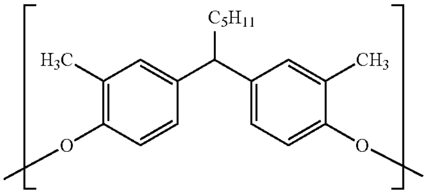
(B2-5)
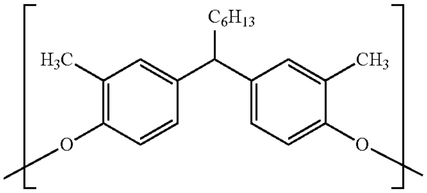
(B2-6)
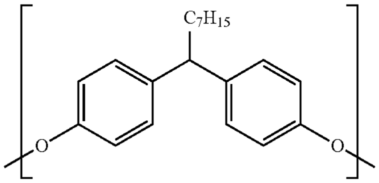
(B2-7)
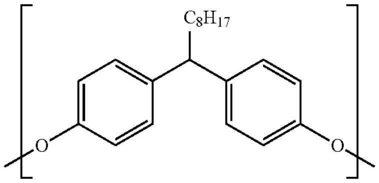
(B2-8)
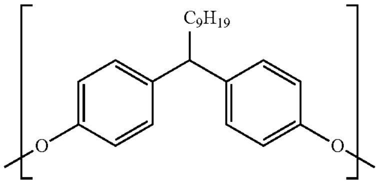
(B2-9)
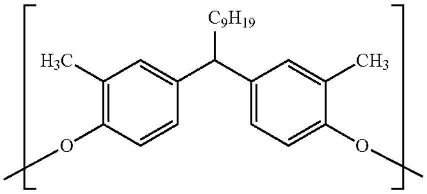
(B2-10)
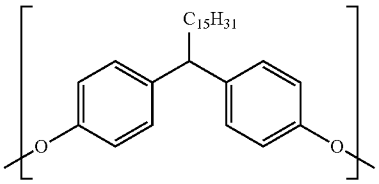

-continued (B2-11)

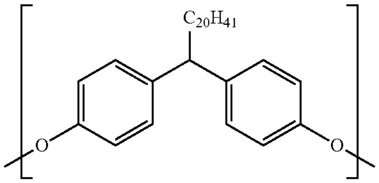

Hereinafter, diol units (B3-1) to (B3-4) are shown as specific examples of the diol unit (B3). The diol unit (B3) is not limited thereto.

(B3-1)

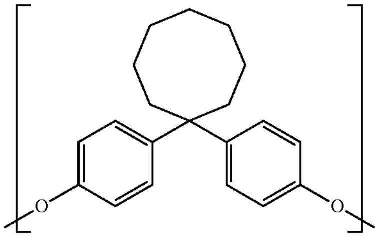

(B3-2)

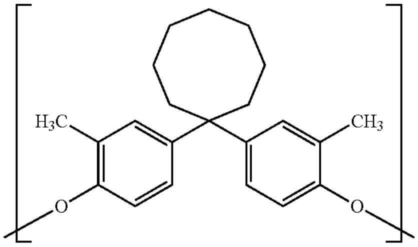

(B3-3)

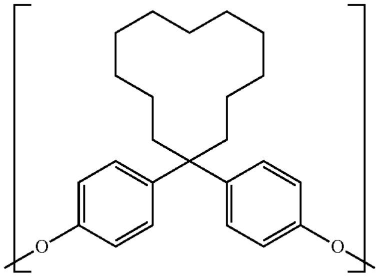

(B3-4)

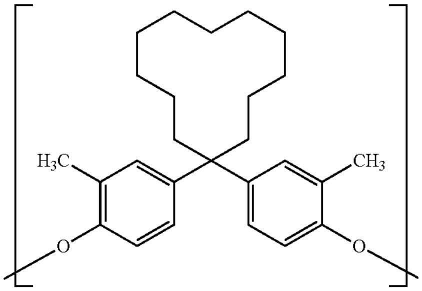

Hereinafter, diol units (B4-1) to (B4-7) are shown as specific examples of the diol unit (B4). The diol unit (B4) is not limited thereto.

(B4-1)

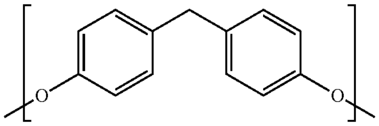

(B4-2)

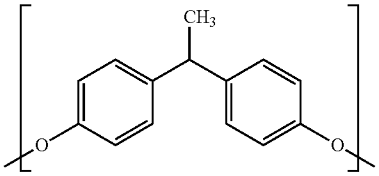

(B4-3)

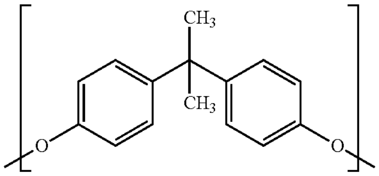

(B4-4)

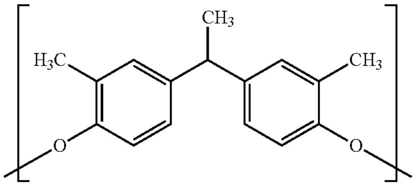

(B4-5)

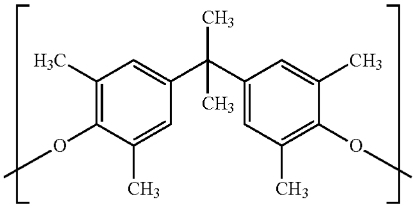

(B4-6)

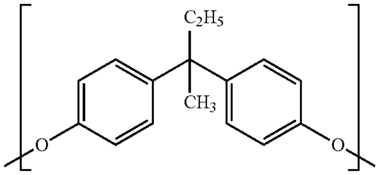

(B4-7)

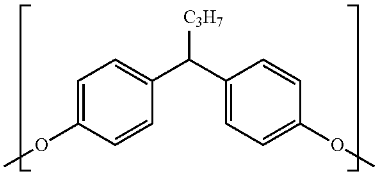

Hereinafter, diol units (B5-1) to (B5-6) are shown as specific examples of the diol unit (B5). The diol unit (B5) is not limited thereto.

-continued
(B5-1)
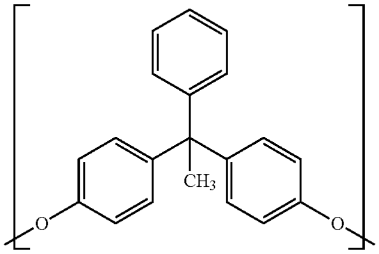
(B5-2)
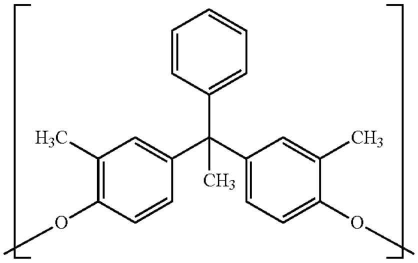
(B5-3)
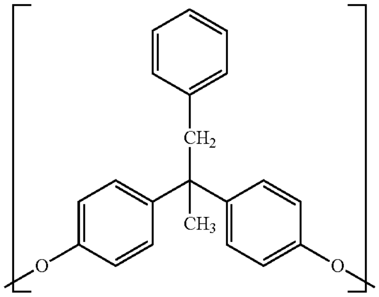
(B5-4)
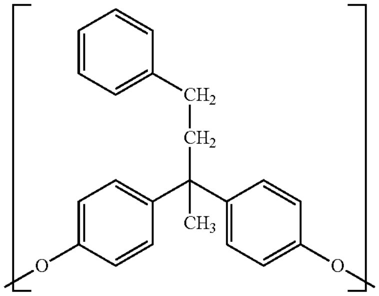
(B5-5)
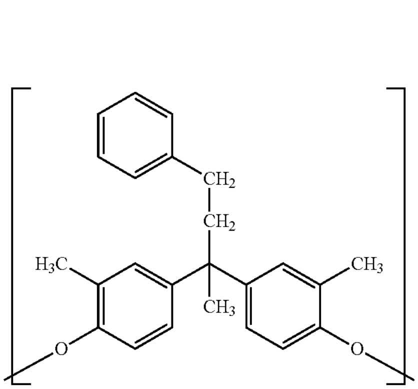
(B5-6)
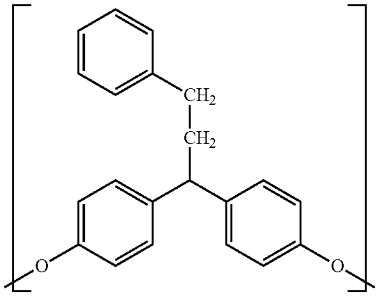
Hereinafter, diol units (B6-1) to (B6-4) are shown as specific examples of the diol unit (B6). The diol unit (B6) is not limited thereto.
(B6-1)
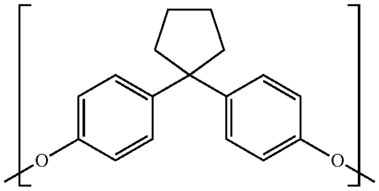
(B6-2)
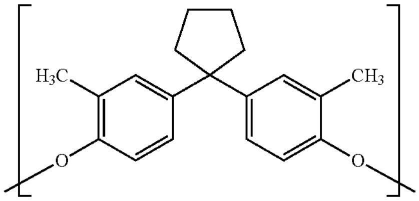
(B6-3)
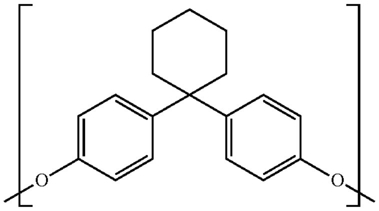
(B6-4)
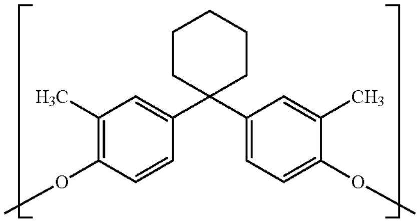
Hereinafter, diol units (B7-1) to (B7-3) are shown as specific examples of the diol unit (B7). The diol unit (B7) is not limited thereto.
(B7-1)
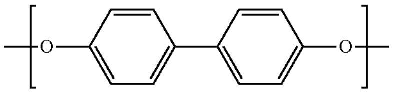

-continued (B7-2)

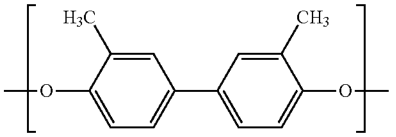

(B7-3)

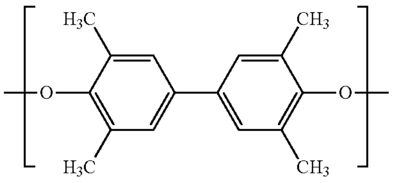

Hereinafter, diol units (B8-1) to (B8-3) are shown as specific examples of the diol unit (B8). The diol unit (B8) is not limited thereto.

(B8-1)

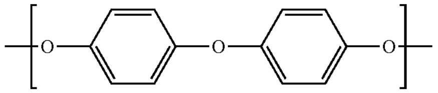

(B8-2)

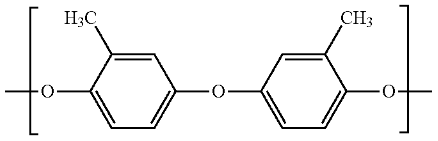

(B8-3)

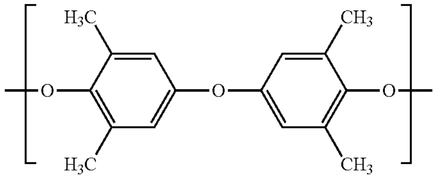

The diol unit (B) contained in the polyester resin (1) may be used alone or in combination of two or more kinds thereof.

The mass proportion of the diol unit (B) in the polyester resin (1) is, for example, preferably 25% by mass or greater and 80% by mass or less.

In a case where the mass proportion of the diol unit (B) is 25% by mass or greater, peeling of the photosensitive layer can be further suppressed. From this viewpoint, the mass proportion of the diol unit (B) is, for example, more preferably 30% by mass or greater and still more preferably 35% by mass or greater.

In a case where the mass proportion of the diol unit (B) is 80% by mass or less, the solubility in a coating solution for forming the photosensitive layer is maintained, and thus the abrasion resistance can be improved. From this viewpoint, the mass proportion of the diol unit (B) is, for example, more preferably 75% by mass or less and still more preferably 70% by mass or less.

A terminal of the polyester resin (1) may be sealed or modified with a terminal-sealing agent, a molecular weight modifier, or the like used in a case of the production. Examples of the terminal-sealing agent or the molecular weight modifier include monohydric phenol, monovalent acid chloride, monohydric alcohol, and monovalent carboxylic acid.

The weight-average molecular weight of the polyester resin (1) is, for example, preferably 30,000 or greater and 300,000 or less, more preferably 40,000 or greater and 250,000 or less, and still more preferably 50,000 or greater and 200,000 or less.

The molecular weight of the polyester resin (1) is a molecular weight measured by gel permeation chromatography (GPC) in terms of polystyrene. The GPC is carried out by using tetrahydrofuran as an eluent.

Examples of the method of producing the polyester resin (1) include an interfacial polymerization method, a solution polymerization method, and a melt polymerization method.

Polycarbonate Resin That Has Constitutional Unit Having Aromatic Ring As the polycarbonate resin that has a constitutional unit having an aromatic ring, for example, a polycarbonate resin (1) having a constitutional unit (C) is preferable.

The constitutional unit (C) is a constitutional unit represented by Formula (C).

Formula (C)

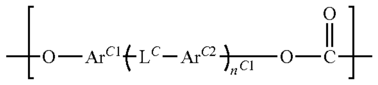

In Formula (C), $Ar^{C1}$ and $Ar^{C2}$ each independently represent an aromatic ring that may have a substituent, $L^{C}$ represents a single bond or a divalent linking group, and $n^{C1}$ represents 0, 1, or 2.

The aromatic ring as $Ar^{C1}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{C1}$ may be substituted with an alkyl group, an aryl group, an aralkyl group, an alkoxy group, an aryloxy group, a halogen atom, or the like. As the substituent in a case where the aromatic ring as $Ar^{C1}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

The aromatic ring as $Ar^{C2}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{C2}$ may be substituted with an alkyl group, an aryl group, an aralkyl group, an alkoxy group, an aryloxy group, a halogen atom, or the like. As the substituent in a case where the aromatic ring as $Ar^{C2}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

In a case where $L^{C}$ represents a divalent linking group, examples of the divalent linking group include an oxygen atom, a sulfur atom, and —C(Rc$^1$)(Rc$^2$)-. Here, $Rc^1$ and $Rc^2$ each independently represent a hydrogen atom, an alkyl group having 1 or more and 20 or less carbon atoms, an aryl group having 6 or more and 12 or less carbon atoms, or an aralkyl group having 7 or more and 20 or less carbon atoms, and $Rc^1$ and $Rc^2$ may be bonded to each other to form a cyclic alkyl group.

The alkyl group having 1 or more and 20 or less carbon atoms as $Rc^1$ and $Rc^2$ may be linear, branched, or cyclic. The number of carbon atoms of the alkyl group is, for example, preferably 1 or more and 18 or less, more preferably 1 or more and 14 or less, and still more preferably 1 or more and 10 or less.

The aryl group having 6 or more and 12 or less carbon atoms as $Rc^1$ and $Rc^2$ may be any of a monocycle or a polycycle. The number of carbon atoms of the aryl group is, for example, preferably 6 or more and 10 or less and more preferably 6.

The alkyl group in the aralkyl group having 7 or more and 20 or less carbon atoms as $Rc^1$ and $Rc^2$ may be any of linear, branched, or cyclic. The number of carbon atoms of the alkyl group in the aralkyl group having 7 or more and 20 or less carbon atoms is, for example, preferably 1 or more and 4 or less, more preferably 1 or more and 3 or less, and still more preferably 1 or 2.

The aryl group in the aralkyl group having 7 or more and 20 or less carbon atoms as $Rc^1$ and $Rc^2$ may be any of a monocycle or a polycycle. The number of carbon atoms of the aryl group is, for example, preferably 6 or more and 10 or less and more preferably 6.

It is preferable that the constitutional unit (C) includes, for example, at least one selected from the group consisting of a constitutional unit (Ca1) represented by Formula (Ca1), a constitutional unit (Ca2) represented by Formula (Ca2), a constitutional unit (Ca3) represented by Formula (Ca3), a constitutional unit (Ca4) represented by Formula (Ca4), a constitutional unit (Cb1) represented by Formula (Cb1), a constitutional unit (Cb2) represented by Formula (Cb2), a constitutional unit (Cb3) represented by Formula (Cb3), a constitutional unit (Cb4) represented by Formula (Cb4), a constitutional unit (Cb5) represented by Formula (Cb5), a constitutional unit (Cb6) represented by Formula (Cb6), a constitutional unit (Cb7) represented by Formula (Cb7), and a constitutional unit (Cb8) represented by Formula (Cb8).

Fomrula (Ca1)

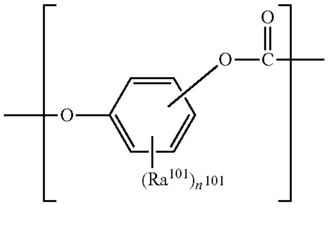

In Formula (Ca1), $n^{101}$ represents an integer of 0 or greater and 4 or less, and $n^{101}$ pieces of $Ra^{101}$'s each independently represent an alkyl group having 1 or more and 10 or less carbon atoms, an aryl group having 6 or more and 12 or less carbon atoms, or an alkoxy group having 1 or more and 6 or less carbon atoms.

$Ra^{101}$ and $n^{101}$ in Formula (Ca1) each have the same definition as that for $Ra^{101}$ and $n^{101}$ in Formula (A1), and the specific forms thereof are also the same as each other.

Formula (Ca2)

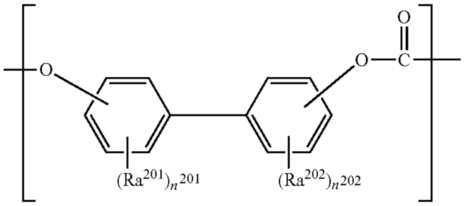

In Formula (Ca2), $n^{201}$ and $n^{202}$ each independently represent an integer of 0 or greater and 4 or less, and $n^{201}$ pieces of $Ra^{201}$'s and $n^{202}$ pieces of $Ra^{202}$'s each independently represent an alkyl group having 1 or more and 10 or less carbon atoms, an aryl group having 6 or more and 12 or less carbon atoms, or an alkoxy group having 1 or more and 6 or less carbon atoms. $Ra^{201}$, $Ra^{202}$, $n^{201}$, and $n^{202}$ in Formula (Ca2) each have the same definition as that for $Ra^{201}$, $Ra^{202}$, $n^{201}$, and $n^{202}$ in Formula (A2), and the specific forms thereof are also the same as each other.

Formula (Ca3)

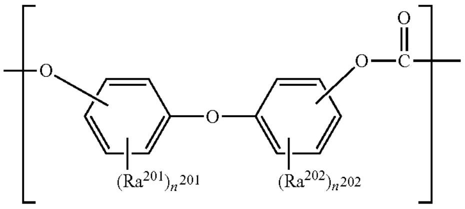

In Formula (Ca3), $n^{301}$ and $n^{302}$ each independently represent an integer of 0 or greater and 4 or less, and $n^{301}$ pieces of $Ra^{101}$'s and $n^{302}$ pieces of $Ra^{302}$'s each independently represent an alkyl group having 1 or more and 10 or less carbon atoms, an aryl group having 6 or more and 12 or less carbon atoms, or an alkoxy group having 1 or more and 6 or less carbon atoms.

$Ra^{301}$, $Ra^{302}$, $n^{301}$, and $n^{302}$ in Formula (Ca3) each have the same definition as that for $Ra^{301}$, $Ra^{302}$, $n^{301}$, and $n^{302}$ in Formula (A3), and the specific forms thereof are also the same as each other.

Formula (Ca4)

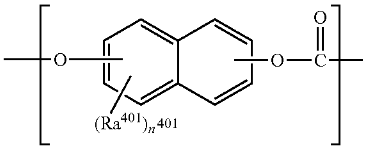

In Formula (Ca4), $n^{401}$ represents an integer of 0 or greater and 6 or less, and $n^{401}$ pieces of $Ra^{401}$'s each independently represent an alkyl group having 1 or more and 10 or less carbon atoms, an aryl group having 6 or more and 12 or less carbon atoms, or an alkoxy group having 1 or more and 6 or less carbon atoms.

$Ra^{401}$ and $n^{401}$ in Formula (Ca4) each have the same definition as that for $Ra^{401}$ and $n^{401}$ in Formula (A4), and the specific forms thereof are also the same as each other.

Formula (Cb1)

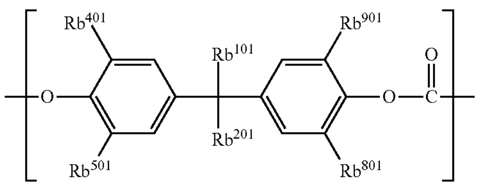

In Formula (Cb1), $Rb^{101}$ represents a branched alkyl group having 4 or more and 20 or less carbon atoms, $Rb^{201}$ represents a hydrogen atom or an alkyl group having 1 or more and 3 or less carbon atoms, and $Rb^{401}$, $Rb^{501}$, $Rb^{801}$, and $Rb^{901}$ each independently represent a hydrogen atom, an alkyl group having 1 or more and 4 or less carbon atoms, an alkoxy group having 1 or more and 6 or less carbon atoms, or a halogen atom.

$Rb^{101}$, $Rb^{201}$, $Rb^{401}$, $Rb^{501}$, $Rb^{801}$, and $Rb^{901}$ in Formula (Cb1) each have the same definition as that for $Rb^{101}$, $Rb^{201}$, $Rb^{401}$, $Rb^{501}$, $Rb^{801}$, and $Rb^{901}$ in Formula (B1), and the specific forms thereof are also the same as each other.

Formula (Cb2)

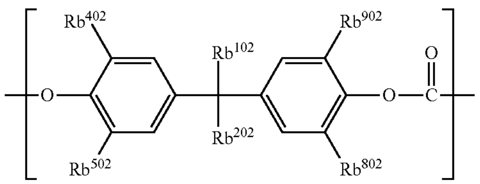

In Formula (Cb2), $Rb^{102}$ represents a linear alkyl group having 4 or more and 20 or less carbon atoms, $Rb^{202}$ represents a hydrogen atom or an alkyl group having 1 or more and 3 or less carbon atoms, and $Rb^{402}$, $Rb^{502}$, $Rb^{802}$, and $Rb^{902}$ each independently represent a hydrogen atom, an alkyl group having 1 or more and 4 or less carbon atoms, an alkoxy group having 1 or more and 6 or less carbon atoms, or a halogen atom.

$Rb^{102}$, $Rb^{202}$, $Rb^{402}$, $Rb^{502}$, $Rb^{802}$, and $Rb^{902}$ in Formula (Cb2) each have the same definition as that for $Rb^{102}$, $Rb^{202}$, $Rb^{402}$, $Rb^{502}$, $Rb^{802}$, and $Rb^{902}$ in Formula (B2), and the specific forms thereof are also the same as each other.

Formula (Cb3)

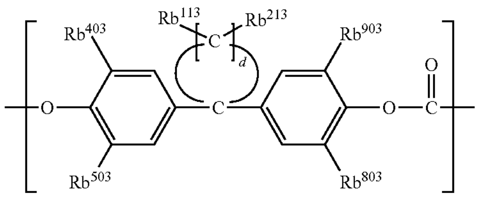

In Formula (Cb3), $Rb^{113}$ and $Rb^{213}$ each independently represent a hydrogen atom, a linear alkyl group having 1 or more and 3 or less carbon atoms, an alkoxy group having 1 or more and 4 or less carbon atoms, or a halogen atom, d represents an integer of 7 or greater and 15 or less, and $Rb^{403}$, $Rb^{503}$, $Rb^{803}$, and $Rb^{903}$ each independently represent a hydrogen atom, an alkyl group having 1 or more and 4 or less carbon atoms, an alkoxy group having 1 or more and 6 or less carbon atoms, or a halogen atom.

$Rb^{113}$, $Rb^{213}$, d, $Rb^{403}$, $Rb^{503}$, $Rb^{803}$, and $Rb^{903}$ in Formula (Cb3) each have the same definition as that for $Rb^{113}$, $Rb^{213}$, d, $Rb^{403}$, $Rb^{503}$, $Rb^{803}$, and $Rb^{903}$ in Formula (B3), and the specific forms thereof are also the same as each other.

Formula (Cb4)

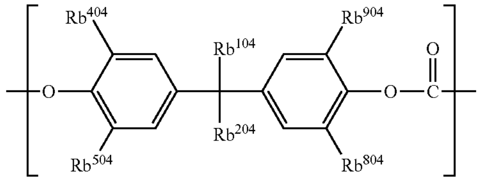

In Formula (Cb4), $Rb^{104}$ and $Rb^{204}$ each independently represent a hydrogen atom or an alkyl group having 1 or more and 3 or less carbon atoms, and $Rb^{404}$, $Rb^{504}$, $Rb^{804}$, and $Rb^{904}$ each independently represent a hydrogen atom, an alkyl group having 1 or more and 4 or less carbon atoms, an alkoxy group having 1 or more and 6 or less carbon atoms, or a halogen atom.

$Rb^{104}$, $Rb^{204}$, $Rb^{404}$, $Rb^{504}$, $Rb^{804}$, and $Rb^{904}$ in Formula (Cb4) each have the same definition as that for $Rb^{104}$, $Rb^{204}$, $Rb^{404}$, $Rb^{504}$, $Rb^{804}$ and $Rb^{904}$ in Formula (B4), and the specific forms thereof are also the same as each other.

Formula (Cb5)

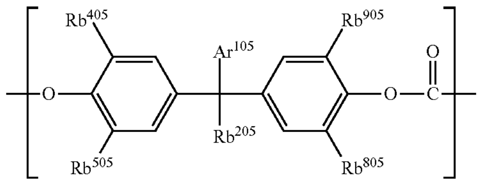

In Formula (Cb5), $Ar^{105}$ represents an aryl group having 6 or more and 12 or less carbon atoms or an aralkyl group having 7 or more and 20 or less carbon atoms, $Rb^{205}$ represents a hydrogen atom or an alkyl group having 1 or more and 3 or less carbon atoms, and $Rb^{405}$, $Rb^{505}$, $Rb^{805}$, and $Rb^{905}$ each independently represent a hydrogen atom, an alkyl group having 1 or more and 4 or less carbon atoms, an alkoxy group having 1 or more and 6 or less carbon atoms, or a halogen atom.

$Ar^{105}$, $Rb^{205}$, $Rb^{405}$, $Rb^{505}$, $Rb^{805}$, and $Rb^{905}$ in Formula (Cb5) each have the same definition as that for $Ar^{105}$, $Rb^{205}$, $Rb^{405}$, $Rb^{505}$, $Rb^{805}$, and $Rb^{905}$ in Formula (B5), and the specific forms thereof are also the same as each other.

Formula (Cb6)

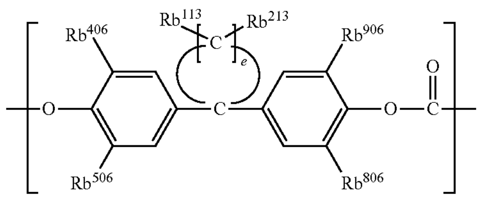

In Formula (Cb6), $Rb^{116}$ and $Rb^{216}$ each independently represent a hydrogen atom, a linear alkyl group having 1 or more and 3 or less carbon atoms, an alkoxy group having 1 or more and 4 or less carbon atoms, or a halogen atom, e represents an integer of 4 or greater and 6 or less, and $Rb^{406}$, $Rb^{506}$, $Rb^{806}$, and $Rb^{906}$ each independently represent a hydrogen atom, an alkyl group having 1 or more and 4 or less carbon atoms, an alkoxy group having 1 or more and 6 or less carbon atoms, or a halogen atom.

$Rb^{116}$, $Rb^{216}$, e, $Rb^{406}$, $Rb^{506}$, $Rb^{806}$, and $Rb^{906}$ in Formula (Cb6) each have the same definition as that for $Rb^{116}$, $Rb^{216}$, e, $Rb^{406}$, $Rb^{506}$, $Rb^{806}$, and $Rb^{906}$ in Formula (B6), and the specific forms thereof are also the same as each other.

Formula (Cb7)

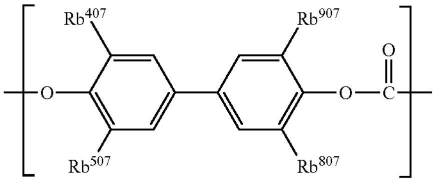

In Formula (Cb7), $Rb^{407}$, $Rb^{507}$, $Rb^{807}$, and $Rb^{907}$ each independently represent a hydrogen atom, an alkyl group having 1 or more and 4 or less carbon atoms, an alkoxy group having 1 or more and 6 or less carbon atoms, or a halogen atom.

$Rb^{407}$, $Rb^{507}$, $Rb^{807}$, and $Rb^{907}$ in Formula (Cb7) each have the same definition as that for $Rb^{407}$, $Rb^{507}$, $Rb^{807}$, and $Rb^{907}$ in Formula (B7), and the specific forms thereof are also the same as each other.

Formula (Cb8)

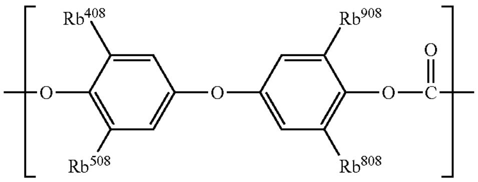

In Formula (Cb8), $Rb^{408}$, $Rb^{508}$, $Rb^{808}$, and $Rb^{908}$ each independently represent a hydrogen atom, an alkyl group having 1 or more and 4 or less carbon atoms, an alkoxy group having 1 or more and 6 or less carbon atoms, or a halogen atom.

$Rb^{408}$, $Rb^{508}$, $Rb^{808}$, and $Rb^{908}$ in Formula (Cb8) each have the same definition as that for $Rb^{408}$, $Rb^{508}$, $Rb^{808}$, and $Rb^{908}$ in Formula (B8), and the specific forms thereof are also the same as each other.

Hereinafter, constitutional units (Ca1-1) to (Ca1-9) are shown as specific examples of the constitutional unit (Ca1). The constitutional unit (Ca1) is not limited thereto.

(Ca1-1)

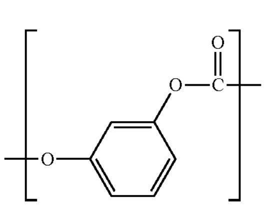

(Ca1-2)

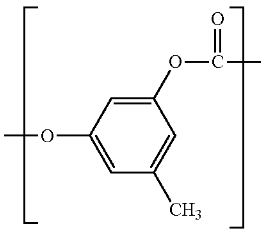

(Ca1-3)

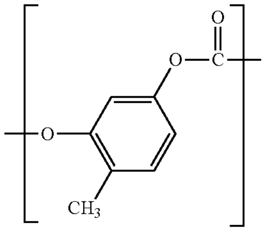

(Ca1-4)

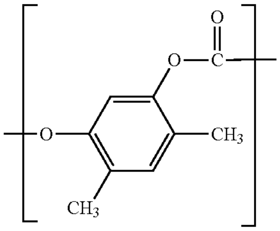

(Ca1-5)

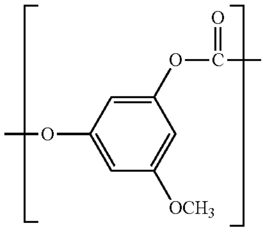

(Ca1-6)

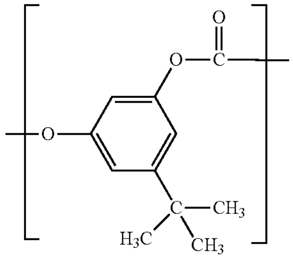

(Ca1-7)

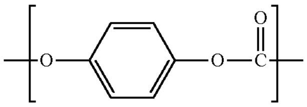

-continued (Ca1-8)

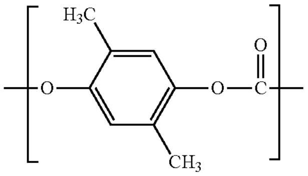

(Ca1-9)

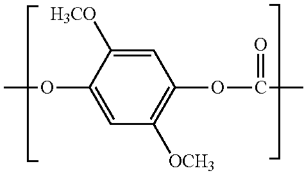

Hereinafter, constitutional units (Ca2-1) to (Ca2-3) are shown as specific examples of the constitutional unit (Ca2). The constitutional unit (Ca2) is not limited thereto.

(Ca2-1)

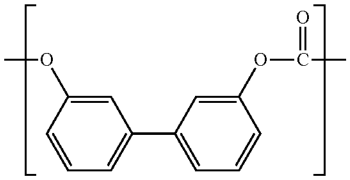

(Ca2-2)

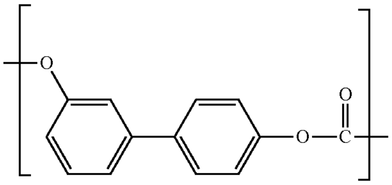

(Ca2-3)

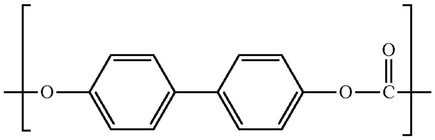

Hereinafter, constitutional units (Ca3-1) and (Ca3-2) are shown as specific examples of the constitutional unit (Ca3). The constitutional unit (Ca3) is not limited thereto.

(Ca3-1)

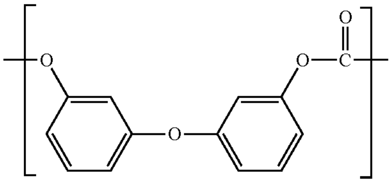

(Ca3-2)

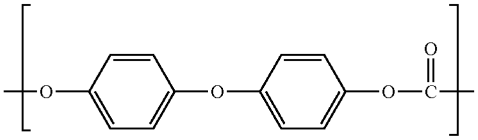

Hereinafter, constitutional units (Ca4-1) to (Ca4-3) are shown as specific examples of the constitutional units (Ca4). The constitutional unit (Ca4) is not limited thereto.

(Ca4-1)

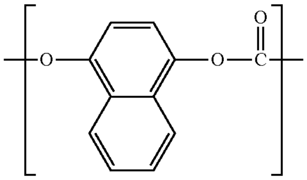

(Ca4-2)

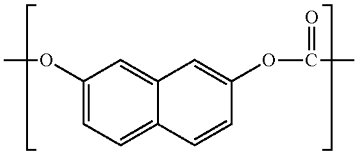

(Ca4-3)

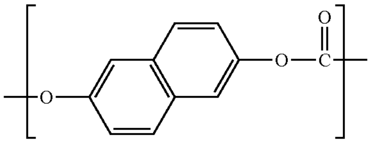

Hereinafter, constitutional units (Cb1-1) to (Cb1-6) are shown as specific examples of the constitutional unit (Cb1). The constitutional unit (Cb1) is not limited thereto.

(Cb1-1)

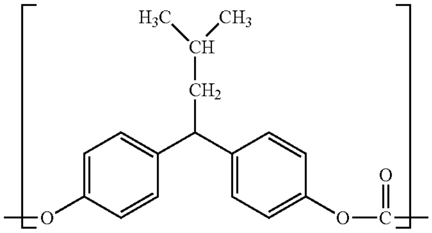

(Cb1-2)

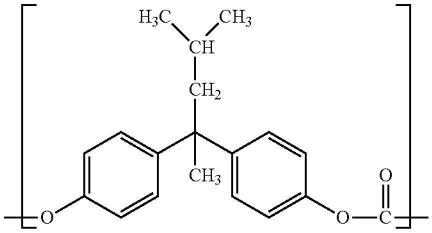

(Cb1-3)

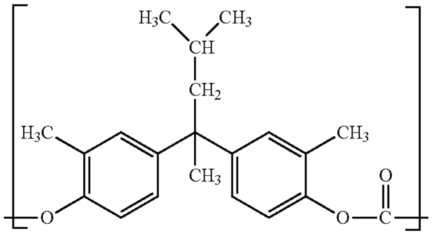

-continued
(Cb1-4)
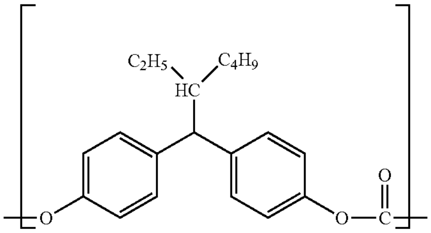
(Cb1-5)
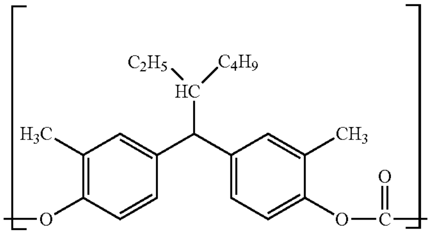
(Cb1-6)
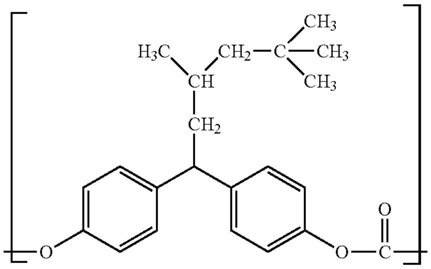
Hereinafter, constitutional units (Cb2-1) to (Cb2-11) are shown as specific examples of the constitutional unit (Cb2). The constitutional unit (Cb2) is not limited thereto.
(Cb2-1)
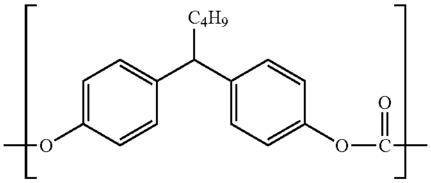
(Cb2-2)
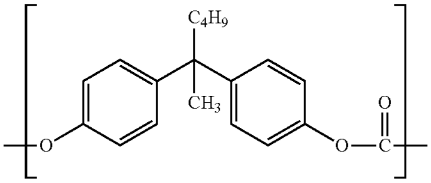
(Cb2-3)
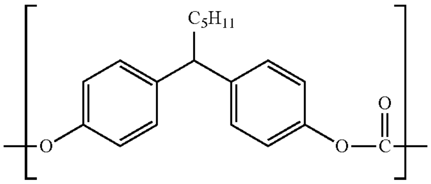
-continued
(Cb2-4)
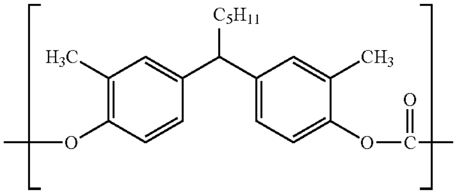
(Cb2-5)
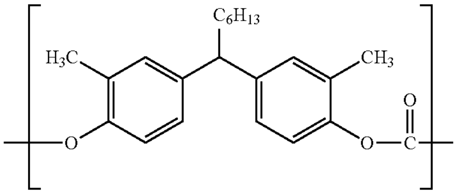
(Cb2-6)
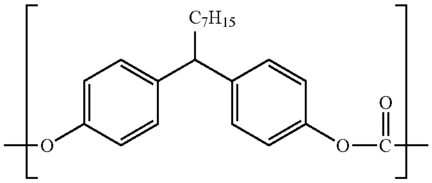
(Cb2-7)
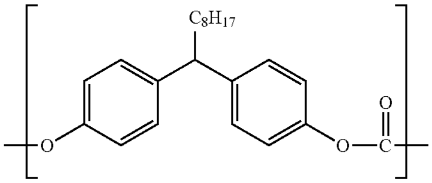
(Cb2-8)
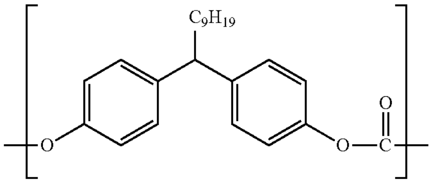
(Cb2-9)
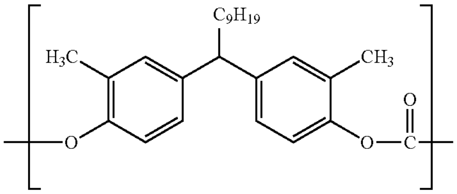
(Cb2-10)
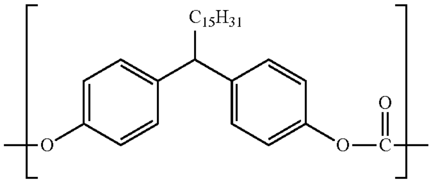

-continued (Cb2-11)

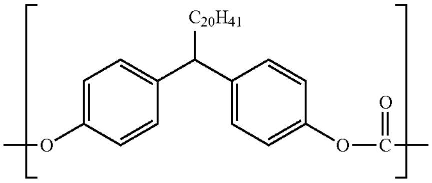

Hereinafter, constitutional units (Cb3-1) to (Cb3-4) are shown as specific examples of the constitutional unit (Cb3). The constitutional unit (Cb3) is not limited thereto.

(Cb3-1)

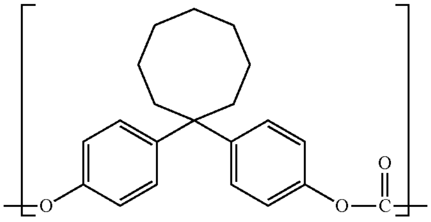

(Cb3-2)

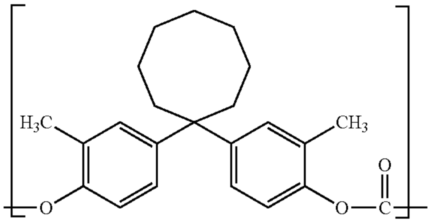

(Cb3-3)

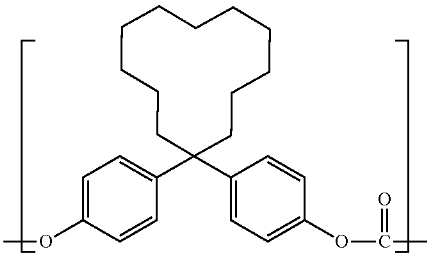

(Cb3-4)

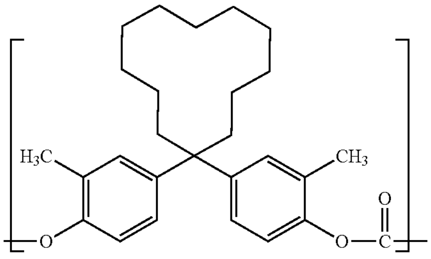

Hereinafter, constitutional units (Cb4-1) to (Cb4-7) are shown as specific examples of the constitutional units (Cb4). The constitutional unit (Cb4) is not limited thereto.

(Cb4-1)

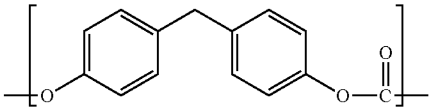

(Cb4-2)

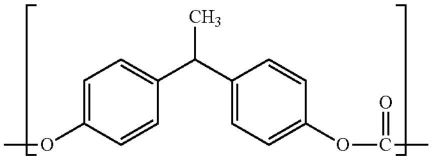

(Cb4-3)

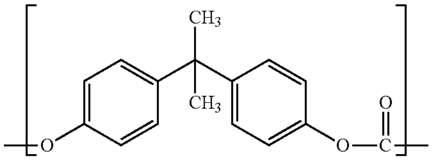

(Cb4-4)

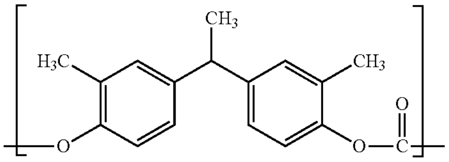

(Cb4-5)

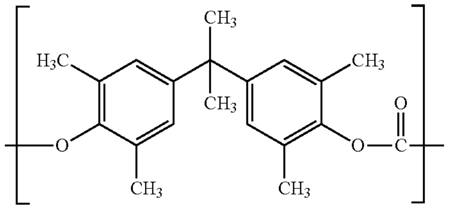

(Cb4-6)

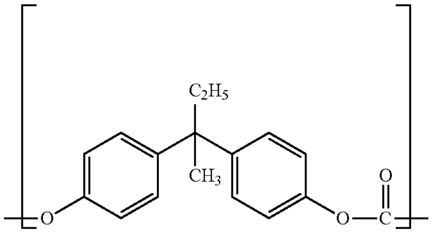

(Cb4-7)

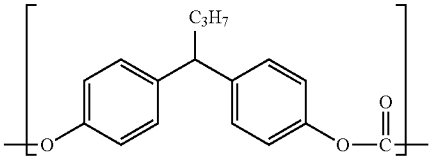

Hereinafter, constitutional units (Cb5-1) to (Cb5-6) are shown as specific examples of the constitutional units (Cb5). The constitutional unit (Cb5) is not limited thereto.

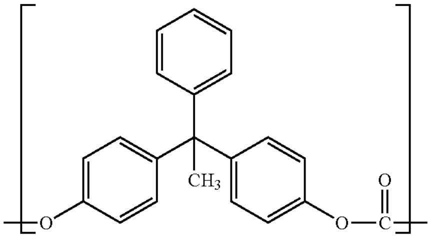
(Cb5-1)
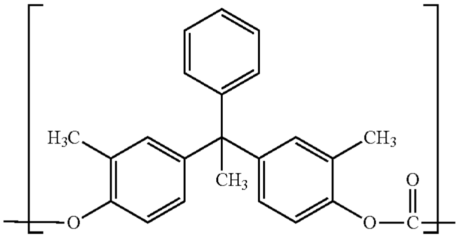
(Cb5-2)
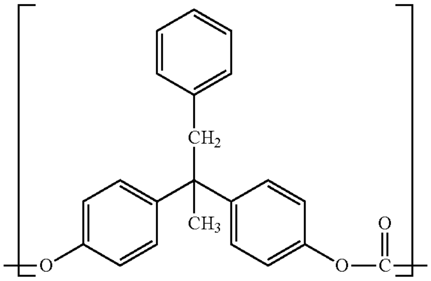
(Cb5-3)
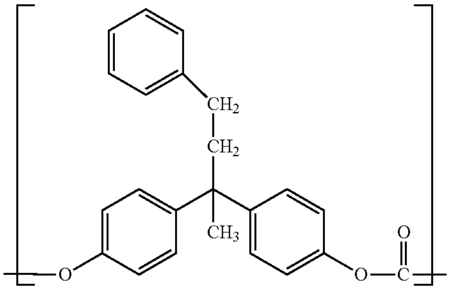
(Cb5-4)
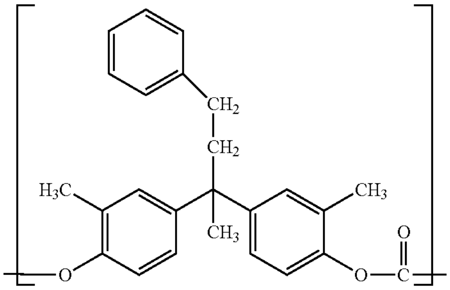
(Cb5-5)
-continued
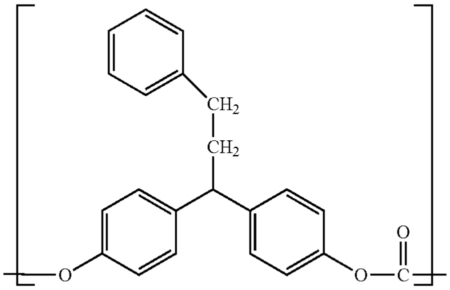
(Cb5-6)
Hereinafter, constitutional units (Cb6-1) to (Cb6-4) are shown as specific examples of the constitutional units (Cb6). The constitutional unit (Cb6) is not limited thereto.
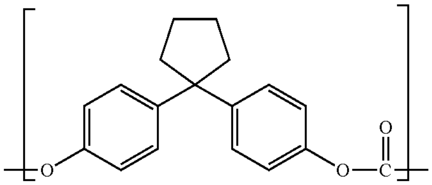
(Cb6-1)
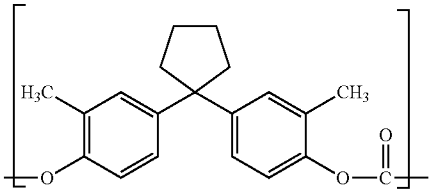
(Cb6-2)
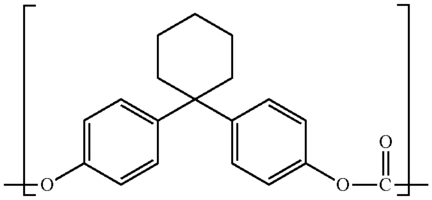
(Cb6-3)
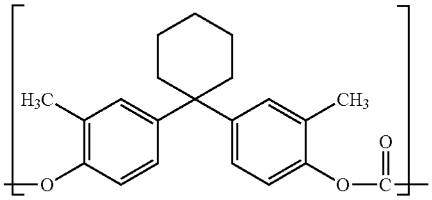
(Cb6-4)
Hereinafter, constitutional units (Cb7-1) to (Cb7-3) are shown as specific examples of the constitutional units (Cb7). The constitutional unit (Cb7) is not limited thereto.
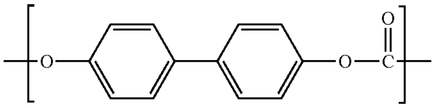
(Cb7-1)

-continued (Cb7-2)

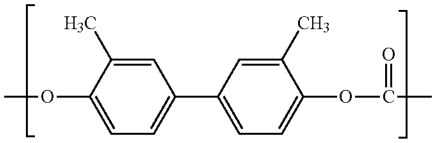

(Cb7-3)

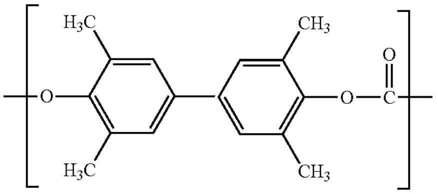

Hereinafter, constitutional units (Cb8-1) to (Cb8-3) are shown as specific examples of the constitutional unit (Cb8). The constitutional unit (Cb8) is not limited thereto.

(Cb8-1)

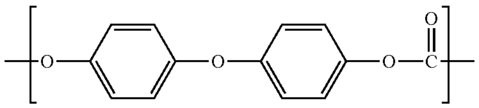

(Cb8-2)

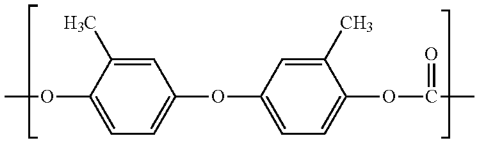

(Cb8-3)

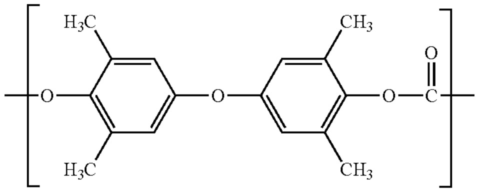

The constitutional unit (C) contained in the polycarbonate resin (1) may be used alone or two or more kinds thereof.

The polycarbonate resin (1) may have other constitutional units in addition to the constitutional unit (C). Examples of other constitutional units include a constitutional unit derived from an aliphatic diol (such as ethylene glycol, diethylene glycol, triethylene glycol, propylene glycol, butanediol, hexanediol, or neopentyl glycol) and phosgene, and a constitutional unit derived from an alicyclic diol (such as cyclohexanediol, cyclohexane dimethanol, or hydrogenated bisphenol A) and phosgene. These constitutional units contained in the polycarbonate resin (1) may be used alone or two or more kinds thereof.

The mass proportion of the constitutional unit (C) in the mass of the polycarbonate resin (1) is, for example, preferably 80% by mass or greater and 100% by mass or less, more preferably 90% by mass or greater and 100% by mass or less, and still more preferably 95% by mass or greater and 100% by mass or less.

It is preferable that the polycarbonate resin (1) includes, for example, as the constitutional unit (C), at least one selected from the group consisting of a constitutional unit (Cb1), a constitutional unit (Cb2), a constitutional unit (Cb3), a constitutional unit (Cb4), a constitutional unit (Cb5), a constitutional unit (Cb6), a constitutional unit (Cb7), and a constitutional unit (Cb8). The total mass proportion of the constitutional unit (Cb1), the constitutional unit (Cb2), the constitutional unit (Cb3), the constitutional unit (Cb4), the constitutional unit (Cb5), the constitutional unit (Cb6), the constitutional unit (Cb7), and the constitutional unit (Cb8) in the mass of the polycarbonate resin (1) is, for example, preferably 80% by mass or greater and 100% by mass or less, more preferably 90% by mass or greater and 100% by mass or less, and still more preferably 95% by mass or greater and 100% by mass or less.

The weight-average molecular weight of the polycarbonate resin (1) is, for example, preferably 35,000 or greater and 300,000 or less, more preferably 40,000 or greater and 250,000 or less, and still more preferably 50,000 or greater and 200,000 or less.

The molecular weight of the polycarbonate resin (1) is a molecular weight measured by gel permeation chromatography (GPC) in terms of polystyrene. The GPC is carried out by using tetrahydrofuran as an eluent.

Examples of the method of producing the polycarbonate resin (1) include an interfacial polymerization method, a solution polymerization method, and a melt polymerization method.

Layer Configuration of Photoreceptor

The photoreceptor may be a lamination type photoreceptor including a lamination type photosensitive layer in which a charge generation layer containing a charge generation material and a charge transport layer containing a charge transport material are laminated or a single layer type photoreceptor including a single layer type photosensitive layer containing a charge generation material and a charge transport material.

Figure 3:
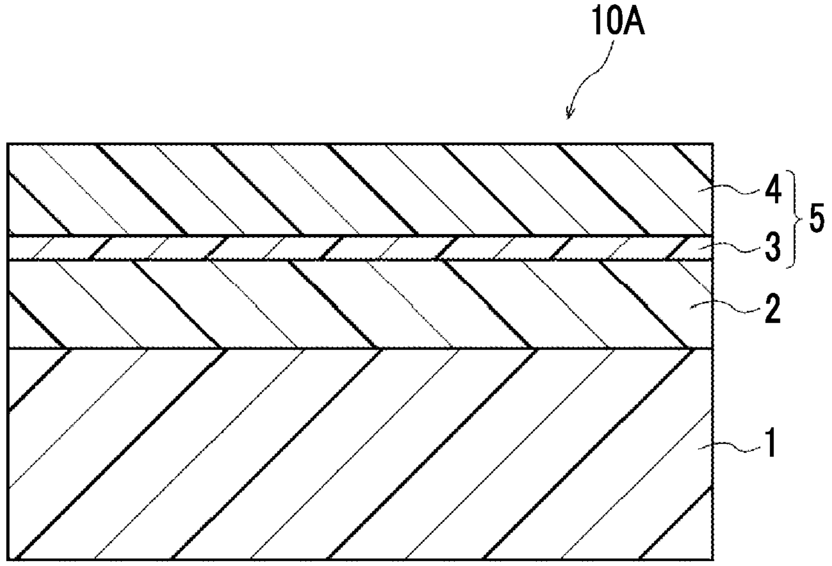
FIG. 3 is a partial cross-sectional view showing an example of a layer configuration of a lamination type photoreceptor.

FIG. 3 is a partial cross-sectional view schematically showing an example of the layer configuration of the lamination type photoreceptor. A photoreceptor 10A shown in FIG. 3 includes a lamination type photosensitive layer. The photoreceptor 10A has a structure in which an undercoat layer 2, a charge generation layer 3, and a charge transport layer 4 are laminated in this order on a conductive substrate 1, and the charge generation layer 3 and the charge transport layer 4 constitute a photosensitive layer 5 (so-called function separation type photosensitive layer). In the photoreceptor 10A, the charge transport layer 4 is the outermost surface layer, and a region 30% from the surface of the charge transport layer 4 with respect to the film thickness of the charge transport layer 4 is the outermost surface region.

Further, the lamination type photoreceptor may not include the undercoat layer 2 of the photoreceptor 10A, and may include another layer such as an interlayer between the undercoat layer 2 and the charge generation layer 3 and may include another layer such as a protective layer on a side of the charge transport layer 4 opposite to the charge generation layer 3. In the lamination type photoreceptor including a protective layer on a side of the charge transport layer 4 opposite to the charge generation layer 3, the protective layer is the outermost surface layer.

Figure 4:
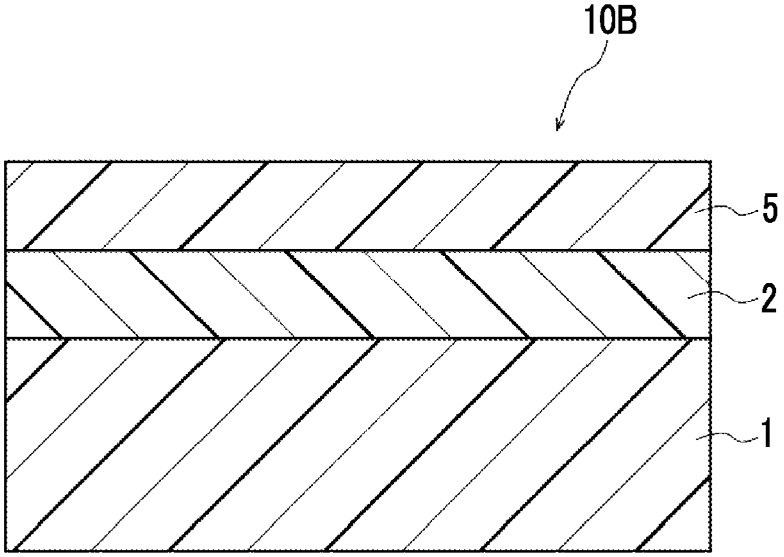
FIG. 4 is a partial cross-sectional view showing an example of a layer configuration of a single layer type photoreceptor.

FIG. 4 is a partial cross-sectional view schematically showing an example of the layer configuration of the single layer type photoreceptor. A photoreceptor 10B shown in FIG. 4 includes a single layer type photosensitive layer. The photoreceptor 10B has a structure in which the undercoat layer 2 and the single layer type photosensitive layer 5 are laminated in this order on the conductive substrate 1. In the photoreceptor 10B, the single layer type photosensitive layer 5 is the outermost surface layer, and a region 30% from the surface of the photosensitive layer 5 with respect to the film thickness of the photosensitive layer 5 is the outermost surface region.

Further, the single layer type photoreceptor may not include the undercoat layer 2 of the photoreceptor 10B, and may include another layer such as an interlayer between the undercoat layer 2 and the photosensitive layer 5 and may include another layer such as a protective layer on a side of the photosensitive layer 5 opposite to the conductive substrate 1. In the single layer type photoreceptor including a protective layer on a side of the photosensitive layer 5 opposite to the conductive substrate 1, the protective layer is the outermost surface layer.

Hereinafter, each layer of the electrophotographic photoreceptor will be described in detail. Further, the reference numerals will not be provided.

Conductive Substrate

Examples of the conductive substrate include metal plates containing metals (such as aluminum, copper, zinc, chromium, nickel, molybdenum, vanadium, indium, gold, and platinum) or alloys (such as stainless steel), metal drums, metal belts, and the like. Further, examples of the conductive substrate include paper, a resin film, a belt, and the like obtained by being coated, vapor-deposited or laminated with a conductive compound (such as a conductive polymer or indium oxide), a metal (such as aluminum, palladium, or gold) or an alloy. Here, the term "conductive" denotes that the volume resistivity is less than $10^{13}$ Ωcm.

In a case where the electrophotographic photoreceptor is used in a laser printer, for example, it is preferable that the surface of the conductive substrate is roughened such that a centerline average roughness Ra thereof is 0.04 μm or greater and 0.5 μm or less for the purpose of suppressing interference fringes from occurring in a case of irradiation with laser beams. Further, in a case where incoherent light is used as a light source, roughening of the surface to prevent interference fringes is not particularly necessary, and roughening of the surface to prevent interference fringes is appropriate for longer life because occurrence of defects due to the roughness of the surface of the conductive substrate is suppressed.

Examples of the roughening method include wet honing performed by suspending an abrasive in water and spraying the suspension to the conductive substrate, centerless grinding performed by pressure-welding the conductive substrate against a rotating grindstone and continuously grinding the conductive substrate, and an anodizing treatment.

Examples of the roughening method also include a method of dispersing conductive or semi-conductive powder in a resin without roughening the surface of the conductive substrate to form a layer on the surface of the conductive substrate, and performing roughening using the particles dispersed in the layer.

The roughening treatment performed by anodization is a treatment of forming an oxide film on the surface of the conductive substrate by carrying out anodization in an electrolytic solution using a conductive substrate made of a metal (for example, aluminum) as an anode. Examples of the electrolytic solution include a sulfuric acid solution and an oxalic acid solution. However, a porous anodized film formed by anodization is chemically active in a natural state, is easily contaminated, and has a large resistance fluctuation depending on the environment. Therefore, for example, it is preferable that a sealing treatment is performed on the porous anodized film so that the fine pores of the oxide film are closed by volume expansion due to a hydration reaction in pressurized steam or boiling water (a metal salt such as nickel may be added thereto) for a change into a more stable a hydrous oxide.

The film thickness of the anodized film is, for example, preferably 0.3 μm or greater and 15 μm or less. In a case where the film thickness is in the above-described range, the barrier properties against injection tend to be exhibited, and an increase in the residual potential due to repeated use tends to be suppressed.

The conductive substrate may be subjected to a treatment with an acidic treatment liquid or a boehmite treatment.

The treatment with an acidic treatment liquid is carried out, for example, as follows. First, an acidic treatment liquid containing phosphoric acid, chromic acid, and hydrofluoric acid is prepared. In the blending ratio of phosphoric acid, chromic acid, and hydrofluoric acid to the acidic treatment liquid, for example, the concentration of the phosphoric acid is 10% by mass or greater and 11% by mass or less, the concentration of the chromic acid is 3% by mass or greater and 5% by mass or less, and the concentration of the hydrofluoric acid is 0.5% by mass or greater and 2% by mass or less, and the concentration of all these acids may be 13.5% by mass or greater and 18% by mass or less. The treatment temperature is, for example, preferably 42° C. or higher and 48° C. or lower. The film thickness of the coating film is, for example, preferably 0.3 m or greater and 15 μm or less.

The boehmite treatment is carried out, for example, by immersing the conductive substrate in pure water at 90° C. or higher and 100° C. or lower for 5 minutes to 60 minutes or by bringing the conductive substrate into contact with heated steam at 90° C. or higher and 120° C. or lower for 5 minutes to 60 minutes. The film thickness of the coating film is, for example, preferably 0.1 μm or greater and 5 μm or less. This coating film may be further subjected to the anodizing treatment using an electrolytic solution having low film solubility, such as adipic acid, boric acid, a borate, a phosphate, a phthalate, a maleate, a benzoate, a tartrate, or a citrate.

Undercoat Layer

The undercoat layer is, for example, a layer containing inorganic particles and a binder resin.

Examples of the inorganic particles include inorganic particles having a powder resistance (volume resistivity) of $10^2$ Ωcm or greater and $10^{11}$ Ωcm or less.

Among these, as the inorganic particles having the above-described resistance value, for example, metal oxide particles such as tin oxide particles, titanium oxide particles, zinc oxide particles, and zirconium oxide particles may be used, and zinc oxide particles are particularly preferable.

The specific surface area of the inorganic particles measured by the BET method may be, for example, 10 $m^2/g$ or greater.

The volume average particle diameter of the inorganic particles may be, for example, 50 nm or greater and 2,000 nm or less (for example, preferably 60 nm or greater and 1,000 nm or less).

The content of the inorganic particles is, for example, preferably 10% by mass or greater and 80% by mass or less and more preferably 40% by mass or greater and 80% by mass or less with respect to the amount of the binder resin.

The inorganic particles may be subjected to a surface treatment. As the inorganic particles, inorganic particles subjected to different surface treatments or inorganic particles having different particle diameters may be used in the form of a mixture of two or more kinds thereof.

Examples of the surface treatment agent include a silane coupling agent, a titanate-based coupling agent, an aluminum-based coupling agent, and a surfactant. In particular, for example, a silane coupling agent is preferable, and a silane coupling agent containing an amino group is more preferable.

Examples of the silane coupling agent containing an amino group include 3-aminopropyltriethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltriethoxysilane, but are not limited thereto.

The silane coupling agent may be used in the form of a mixture of two or more kinds thereof. For example, a silane coupling agent containing an amino group and another silane coupling agent may be used in combination. Examples of other silane coupling agents include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane, but are not limited thereto.

The surface treatment method using a surface treatment agent may be any method as long as the method is a known method, and any of a dry method or a wet method may be used.

The treatment amount of the surface treatment agent is, for example, preferably 0.5% by mass or greater and 10% by mass or less with respect to the amount of the inorganic particles.

Here, the undercoat layer may contain an electron-accepting compound (acceptor compound) together with the inorganic particles, for example, from the viewpoint of enhancing the long-term stability of the electrical properties and the carrier blocking properties.

Examples of the electron-accepting compound include electron-transporting substances, for example, a quinone-based compound such as chloranil or bromanil; a tetracyanoquinodimethane-based compound; a fluorenone compound such as 2,4,7-trinitrofluorenone or 2,4,5,7-tetranitro-9-fluorenone; an oxadiazole-based compound such as 2-(4-biphenyl)-5-(4-t-butylphenyl)-1,3,4-oxadiazole, 2,5-bis(4-naphthyl)-1,3,4-oxadiazole, or 2,5-bis(4-diethylaminophenyl)-1,3,4-oxadiazole; a xanthone-based compound; a thiophene compound; and a diphenoquinone compound such as 3,3',5,5'-tetra-t-butyldiphenoquinone.

In particular, as the electron-accepting compound, for example, a compound having an anthraquinone structure is preferable. As the compound having an anthraquinone structure, for example, a hydroxyanthraquinone compound, an aminoanthraquinone compound, or an aminohydroxyanthraquinone compound is preferable, and specifically, for example, anthraquinone, alizarin, quinizarin, anthrarufin, or purpurin is preferable.

The electron-accepting compound may be contained in the undercoat layer in a state of being dispersed with inorganic particles or in a state of being attached to the surface of each inorganic particle.

Examples of the method of attaching the electron-accepting compound to the surface of the inorganic particle include a dry method and a wet method.

The dry method is, for example, a method of attaching the electron-accepting compound to the surface of each inorganic particle by adding the electron-accepting compound dropwise to inorganic particles directly or by dissolving the electron-accepting compound in an organic solvent while stirring the inorganic particles with a mixer having a large shearing force and spraying the mixture together with dry air or nitrogen gas. The electron-accepting compound may be added dropwise or sprayed, for example, at a temperature lower than or equal to the boiling point of the solvent. After the dropwise addition or the spraying of the electron-accepting compound, the compound may be further baked at 100° C. or higher. The baking is not particularly limited as long as the temperature and the time are adjusted such that the electrophotographic characteristics can be obtained.

The wet method is, for example, a method of attaching the electron-accepting compound to the surface of each inorganic particle by adding the electron-accepting compound to inorganic particles while dispersing the inorganic particles in a solvent using a stirrer, ultrasonic waves, a sand mill, an attritor, or a ball mill, stirring or dispersing the mixture, and removing the solvent. The solvent removing method is carried out by, for example, filtration or distillation so that the solvent is distilled off. After removal of the solvent, the mixture may be further baked at 100° C. or higher. The baking is not particularly limited as long as the temperature and the time are adjusted such that the electrophotographic characteristics can be obtained. In the wet method, the moisture contained in the inorganic particles may be removed before the electron-accepting compound is added, and examples thereof include a method of removing the moisture while stirring and heating the moisture in a solvent and a method of removing the moisture by azeotropically boiling the moisture with a solvent.

Further, the electron-accepting compound may be attached to the surface before or after the inorganic particles are subjected to a surface treatment with a surface treatment agent or simultaneously with the surface treatment performed on the inorganic particles with a surface treatment agent.

The content of the electron-accepting compound may be, for example, 0.01% by mass or greater and 20% by mass or less and preferably 0.01% by mass or greater and 10% by mass or less with respect to the amount of the inorganic particles.

Examples of the binder resin used for the undercoat layer include known polymer compounds such as an acetal resin (such as polyvinyl butyral), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a urea resin, a phenol resin, a phenol-formaldehyde resin, a melamine resin, a urethane resin, an alkyd resin, and an epoxy resin, a zirconium chelate compound, a titanium chelate compound, an aluminum chelate compound, a titanium alkoxide compound, an organic titanium compound, and known materials such as a silane coupling agent.

Examples of the binder resin used for the undercoat layer include a charge-transporting resin containing a charge-transporting group, and a conductive resin (such as polyaniline).

Among these, as the binder resin used for the undercoat layer, for example, a resin insoluble in a coating solvent of the upper layer is preferable, and a resin obtained by reaction between a curing agent and at least one resin selected from the group consisting of a thermosetting resin such as a urea resin, a phenol resin, a phenol-formaldehyde resin, a melamine resin, a urethane resin, an unsaturated polyester resin, an alkyd resin, or an epoxy resin; a polyamide resin, a polyester resin, a polyether resin, a methacrylic resin, an acrylic resin, a polyvinyl alcohol resin, and a polyvinyl acetal resin is particularly preferable.

In a case where these binder resins are used in combination of two or more kinds thereof, the mixing ratio thereof is set as necessary.

The undercoat layer may contain various additives for improving the electrical properties, the environmental stability, and the image quality.

Examples of the additives include known materials, for example, an electron-transporting pigment such as a polycyclic condensed pigment or an azo-based pigment, a zirconium chelate compound, a titanium chelate compound, an aluminum chelate compound, a titanium alkoxide compound, an organic titanium compound, and a silane coupling agent. The silane coupling agent is used for a surface treatment of the inorganic particles as described above, but may be further added to the undercoat layer as an additive.

Examples of the silane coupling agent serving as an additive include vinyltrimethoxysilane, 3-methacryloxypropyl-tris(2-methoxyethoxy)silane, 2-(3,4-epoxycyclohexyl) ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compound include zirconium butoxide, ethyl zirconium acetoacetate, zirconium triethanolamine, acetylacetonate zirconium butoxide, ethyl zirconium butoxide acetoacetate, zirconium acetate, zirconium oxalate, zirconium lactate, zirconium phosphonate, zirconium octanoate, zirconium naphthenate, zirconium laurate, zirconium stearate, zirconium isostearate, zirconium butoxide methacrylate, stearate zirconium butoxide, and isostearate zirconium butoxide.

Examples of the titanium chelate compound include tetraisopropyl titanate, tetranormal butyl titanate, a butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanol aminate, and polyhydroxy titanium stearate.

Examples of the aluminum chelate compound include aluminum isopropylate, monobutoxyaluminum diisopropylate, aluminum butyrate, diethylacetoacetate aluminum diisopropylate, and aluminum tris(ethylacetoacetate).

These additives may be used alone or in the form of a mixture or a polycondensate of a plurality of compounds.

The undercoat layer may have, for example, a Vickers hardness of 35 or greater.

The surface roughness (ten-point average roughness) of the undercoat layer may be adjusted, for example, to ½ from 1/(4n) (n represents a refractive index of an upper layer) of a laser wavelength λ for exposure to be used to suppress moire fringes.

Resin particles or the like may be added to the undercoat layer to adjust the surface roughness. Examples of the resin particles include silicone resin particles and crosslinked polymethyl methacrylate resin particles. Further, the surface of the undercoat layer may be polished to adjust the surface roughness. Examples of the polishing method include buff polishing, a sandblast treatment, wet honing, and a grinding treatment.

The formation of the undercoat layer is not particularly limited, and a known forming method is used. For example, a coating film of a coating solution for forming an undercoat layer in which the above-described components are added to a solvent is formed, and the coating film is dried and, as necessary, heated.

Examples of the solvent for preparing the coating solution for forming an undercoat layer include known organic solvents such as an alcohol-based solvent, an aromatic hydrocarbon solvent, a halogenated hydrocarbon solvent, a ketone-based solvent, a ketone alcohol-based solvent, an ether-based solvent, and an ester-based solvent.

Specific examples of these solvents include typical organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method of dispersing the inorganic particles in a case of preparing the coating solution for forming an undercoat layer include known methods such as a roll mill, a ball mill, a vibration ball mill, an attritor, a sand mill, a colloid mill, and a paint shaker.

Examples of the method of coating the conductive substrate with the coating solution for forming an undercoat layer include typical coating methods such as a blade coating method, a wire bar coating method, a spray coating method, a dip coating method, a bead coating method, an air knife coating method, and a curtain coating method.

The film thickness of the undercoat layer is set to, for example, preferably 15 μm or greater and more preferably 20 μm or greater and 50 μm or less.

Interlayer

Although not shown in the figures, an interlayer may be further provided between the undercoat layer and the photosensitive layer.

The interlayer is, for example, a layer containing a resin. Examples of the resin used for the interlayer include a polymer compound, for example, an acetal resin (such as polyvinyl butyral), a polyvinyl alcohol resin, a polyvinyl acetal resin, a casein resin, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a phenol-formaldehyde resin, or a melamine resin.

The interlayer may be a layer containing an organometallic compound. Examples of the organometallic compound used for the interlayer include an organometallic compound containing metal atoms such as zirconium, titanium, aluminum, manganese, and silicon.

The compounds used for the interlayer may be used alone or in the form of a mixture or a polycondensate of a plurality of compounds.

Among these, it is preferable that the interlayer is, for example, a layer containing an organometallic compound having a zirconium atom or a silicon atom.

The formation of the interlayer is not particularly limited, and a known forming method is used. For example, a coating film of a coating solution for forming an interlayer in which the above-described components are added to a solvent is formed, and the coating film is dried and, as necessary, heated.

Examples of the coating method of forming the interlayer include typical coating methods such as a dip coating method, a push-up coating method, a wire bar coating method, a spray coating method, a blade coating method, an air knife coating method, and a curtain coating method.

The film thickness of the interlayer is set to be, for example, preferably in a range of 0.1 μm or greater and 3 μm or less. Further, the interlayer may be used as the undercoat layer.

Charge Generation Layer

The charge generation layer is, for example, a layer containing a charge generation material and a binder resin. Further, the charge generation layer may be a deposition layer of the charge generation material. The deposition layer of the charge generation material is, for example, preferable in a case where an incoherent light source such as a light emitting diode (LED) or an organic electro-luminescence (EL) image array is used.

Examples of the charge generation material include an azo pigment such as bisazo or trisazo; a fused ring aromatic pigment such as dibromoanthanthrone; a perylene pigment; a pyrrolopyrrole pigment; a phthalocyanine pigment; zinc oxide; and trigonal selenium.

Among these, for example, a metal phthalocyanine pigment or a metal-free phthalocyanine pigment is preferably used as the charge generation material in order to deal with laser exposure in a near infrared region. Specifically, for example, hydroxygallium phthalocyanine, chlorogallium phthalocyanine, dichloro-tin phthalocyanine, and titanyl phthalocyanine are more preferable.

On the other hand, for example, a fused ring aromatic pigment such as dibromoanthanthrone, a thioindigo-based pigment, a porphyrazine compound, zinc oxide, trigonal selenium, or a bisazo pigment is preferable as the charge generation material in order to deal with laser exposure in a near ultraviolet region.

The above-described charge generation material may also be used even in a case where an incoherent light source such as an LED or an organic EL image array having a center wavelength of light emission at 450 nm or greater and 780 nm or less is used, but from the viewpoint of the resolution, the field intensity in the photosensitive layer is increased, and a decrease in charge due to injection of a charge from the substrate, that is, image defects referred to as so-called black spots are likely to occur in a case where a thin film having a thickness of m or less is used as the photosensitive layer. The above-described tendency is evident in a case where a p-type semiconductor such as trigonal selenium or a phthalocyanine pigment is used as the charge generation material that is likely to generate a dark current.

On the other hand, in a case where an n-type semiconductor such as a fused ring aromatic pigment, a perylene pigment, or an azo pigment is used as the charge generation material, a dark current is unlikely to be generated, and image defects referred to as black spots can be suppressed even in a case where a thin film is used as the photosensitive layer.

Further, the n-type is determined by the polarity of the flowing photocurrent using a typically used time-of-flight method, and a material in which electrons more easily flow as carriers than positive holes is determined as the n-type.

The binder resin used for the charge generation layer is selected from a wide range of insulating resins, and the binder resin may be selected from organic photoconductive polymers such as poly-N-vinylcarbazole, polyvinylanthracene, polyvinylpyrene, and polysilane.

Examples of the binder resin include a polyvinyl butyral resin, a polyarylate resin (a polycondensate of bisphenols and aromatic divalent carboxylic acid), a polycarbonate resin, a polyester resin, a phenoxy resin, a vinyl chloride-vinyl acetate copolymer, a polyamide resin, an acrylic resin, a polyacrylamide resin, a polyvinylpyridine resin, a cellulose resin, a urethane resin, an epoxy resin, casein, a polyvinyl alcohol resin, and a polyvinylpyrrolidone resin. Here, the term "insulating" denotes that the volume resistivity is $10^{13}$ Ωcm or greater.

These binder resins may be used alone or in the form of a mixture of two or more kinds thereof.

Further, the blending ratio between the charge generation material and the binder resin is, for example, preferably in a range of 10:1 to 1:10 in terms of the mass ratio.

The charge generation layer may also contain other known additives.

The formation of the charge generation layer is not particularly limited, and a known forming method is used. For example, a coating film of a coating solution for forming a charge generation layer in which the above-described components are added to a solvent is formed, and the coating film is dried and, as necessary, heated. Further, the charge generation layer may be formed by vapor deposition of the charge generation material. The formation of the charge generation layer by vapor deposition is, for example, particularly appropriate in a case where a fused ring aromatic pigment or a perylene pigment is used as the charge generation material.

Examples of the solvent for preparing the coating solution for forming a charge generation layer include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents are used alone or in the form of a mixture of two or more kinds thereof.

As a method of dispersing particles (for example, the charge generation material) in the coating solution for forming a charge generation layer, for example, a media disperser such as a ball mill, a vibration ball mill, an attritor, a sand mill, or a horizontal sand mill, or a medialess disperser such as a stirrer, an ultrasonic disperser, a roll mill, or a high-pressure homogenizer is used. Examples of the high-pressure homogenizer include a collision type high-pressure homogenizer in which a dispersion liquid is dispersed by a liquid-liquid collision or a liquid-wall collision in a high-pressure state, and a penetration type high-pressure homogenizer in which dispersion is performed by causing a dispersion liquid to pass through a micro-flow path in a high-pressure state.

During the dispersion, it is effective to set the average particle diameter of the charge generation material in the coating solution for forming a charge generation layer to 0.5 μm or less, for example, preferably 0.3 μm or less, and more preferably 0.15 μm or less.

Examples of the method of coating the undercoat layer (or the interlayer) with the coating solution for forming a charge generation layer include typical methods such as a blade coating method, a wire bar coating method, a spray coating method, a dip coating method, a bead coating method, an air knife coating method, and a curtain coating method.

The film thickness of the charge generation layer is set to be, for example, in a range of preferably 0.1 μm or greater and 5.0 μm or less and more preferably in a range of 0.2 μm or greater and 2.0 μm or less.

Charge Transport Layer

The charge transport layer is, for example, a layer containing a charge transport material and a binder resin. The charge transport layer may be a layer containing a polymer charge transport material.

Further, in a case where the charge transport layer is the outermost surface layer, the content of the lubricant particles in the outermost surface region of the charge transport layer is in the above-described ranges. Further, in a case where the charge transport layer is the outermost surface layer, for example, it is preferable that the breaking energy of the outermost surface region is in the above-described ranges. Further, in a case where the charge transport layer is the outermost surface layer, for example, it is preferable that the charge transport layer contains, as the binder resin, at least one selected from the group consisting of a polyester resin and a polycarbonate resin. In a case where the charge transport layer is the outermost surface layer, the total content of the polyester resin and the polycarbonate resin with respect to the entire binder resin contained in the charge transport layer is, for example, preferably 80% by mass or greater, more preferably 95% by mass or greater, and still more preferably 98% by mass or greater.

Examples of the charge transport material include a quinone-based compound such as p-benzoquinone, chloranil, bromanil, or anthraquinone; a tetracyanoquinodimethane-based compound; a fluorenone compound such as 2,4,7-trinitrofluorenone; a xanthone-based compound; a benzophenone-based compound; a cyanovinyl-based compound; and an electron-transporting compound such as an ethylene-based compound. Examples of the charge transport material include a positive hole-transporting compound such as a triarylamine-based compound, a benzidine-based compound, an arylalkane-based compound, an aryl-substituted ethylene-based compound, a stilbene-based compound, an anthracene-based compound, or a hydrazone-based compound. These charge transport materials may be used alone or in combination of two or more kinds thereof, but are not limited thereto.

From the viewpoint of the charge mobility, for example, a triarylamine derivative represented by Structural Formula (a-1) or a benzidine derivative represented by Structural Formula (a-2) is preferable as the charge transport material.

(a-1)

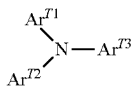

In Structural Formula (a-1), $Ar^{T1}$, $Ar^{T2}$, and $Ar^{T3}$ each independently represent a substituted or unsubstituted aryl group, $—C_6H_4—C(R^{T4})═C(R^{T5})(R^{T6})$, or $—C_6H_4—CH═CH—CH═C(R^{T7})(R^{T8})$. $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of the substituent of each group described above include a halogen atom, an alkyl group having 1 or more and 5 or less carbon atoms, and an alkoxy group having 1 or more and 5 or less carbon atoms. Further, examples of the substituent of each group described above include a substituted amino group substituted with an alkyl group having 1 or more and 3 or less carbon atoms.

(a-2)

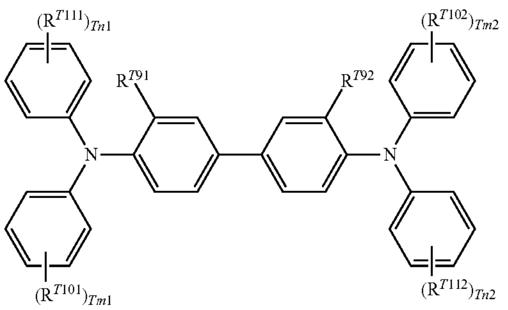

In Structural Formula (a-2), $R^{T91}$ and $R^{T92}$ each independently represent a hydrogen atom, a halogen atom, an alkyl group having 1 or more and 5 or less carbon atoms, or an alkoxy group having 1 or more and 5 or less carbon atoms. $R^{T101}$, $R^{T102}$, $R^{T111}$, and $R^{T112}$ each independently represent a halogen atom, an alkyl group having 1 or more and 5 or less carbon atoms, an alkoxy group having 1 or more and 5 or less carbon atoms, a substituted amino group substituted with an alkyl group having 1 or more and 2 or less carbon atoms, a substituted or unsubstituted aryl group, $—C(R^{T12})═C(R^{T13})(R^{T14})$, or $—CH═CH—CH═C(R^{T15})(R^{T16})$, and $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group. Tm1, Tm2, Tn1, and Tn2 each independently represent an integer of 0 or greater and 2 or less.

Examples of the substituent of each group described above include a halogen atom, an alkyl group having 1 or more and 5 or less carbon atoms, and an alkoxy group having 1 or more and 5 or less carbon atoms. Further, examples of the substituent of each group described above include a substituted amino group substituted with an alkyl group having 1 or more and 3 or less carbon atoms.

Here, among the triarylamine derivative represented by Structural Formula (a-1) and the benzidine derivative represented by Structural Formula (a-2), for example, a triarylamine derivative having "$—C_6H_4—CH═CH—CH═C(R^{T7})(R^{T8})$" and a benzidine derivative having "$—CH═CH—CH═C(R^{T15})(R^{T16})$" are particularly preferable from the viewpoint of the charge mobility.

As the polymer charge transport material, known materials having charge transport properties, such as poly-N-vinylcarbazole and polysilane, can be used. Particularly, for example, a polyester-based polymer charge transport material is particularly preferable. Further, the polymer charge transport material may be used alone or in combination of binder resins.

Examples of the binder resin used for the charge transport layer include a polycarbonate resin, a polyester resin, a polyarylate resin, a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone alkyd resin, a phenol-formaldehyde resin, a styrene-alkyd resin, poly-N-vinylcarbazole, and polysilane. Among these, for example, a polycarbonate resin or a polyarylate resin is preferable as the binder resin. These binder resins may be used alone or in combination of two or more kinds thereof.

Further, the blending ratio between the charge transport material and the binder resin is, for example, preferably in a range of 10:1 to 1:5 in terms of the mass ratio.

The charge transport layer may also contain other known additives.

The formation of the charge transport layer is not particularly limited, and a known forming method is used. For example, a coating film of a coating solution for forming a charge transport layer in which the above-described components are added to a solvent is formed, and the coating film is dried and, as necessary, heated.

Examples of the solvent for preparing the coating solution for forming a charge transport layer include typical organic solvents, for example, aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. These solvents are used alone or in the form of a mixture of two or more kinds thereof.

Examples of the coating method of coating the charge generation layer with the coating solution for forming a charge transport layer include typical methods such as a blade coating method, a wire bar coating method, a spray coating method, a dip coating method, a bead coating method, an air knife coating method, and a curtain coating method.

The film thickness of the charge transport layer is set to be, for example, preferably in a range of 5 μm or greater and 50 μm or less and more preferably in a range of 10 μm or greater and 30 μm or less.

Protective Layer

In a case where a protective layer is provided on a side of the charge transport layer opposite to the charge generation layer or on a side of the single layer type photosensitive layer opposite to the conductive substrate, and the protective layer is the outermost surface layer, the content of the lubricant particles in the outermost surface region of the protective layer is in the above-described ranges. Further, in a case where the protective layer is the outermost surface layer, for example, it is preferable that the breaking energy in the outermost surface region is in the above-described ranges.

A protective layer is provided on the photosensitive layer as necessary. The protective layer is provided, for example, for the purpose of preventing a chemical change in the photosensitive layer during charging and further improving the mechanical strength of the photosensitive layer.

Therefore, for example, a layer formed of a cured film (crosslinked film) may be applied to the protective layer. Examples of these layers include the layers described in the items 1) and 2) below.

1) A layer formed of a cured film of a composition containing a reactive group-containing charge transport material having a reactive group and a charge-transporting skeleton in an identical molecule (that is, a layer containing a polymer or a crosslinked body of the reactive group-containing charge transport material)
2) A layer formed of a cured film of a composition containing a non-reactive charge transport material and a reactive group-containing non-charge transport material containing a reactive group without having a charge-transporting skeleton (that is, a layer containing the non-reactive charge transport material and a polymer or crosslinked body of the reactive group-containing non-charge transport material)

Examples of the reactive group of the reactive group-containing charge transport material include known reactive groups such as a chain polymerizable group, an epoxy group, —OH, —OR [here, R represents an alkyl group], $—NH_2$, —SH, —COOH, and $—SiR^{Q1}_{3-Qn}(OR^{Q2})_{Qn}$ [here, $R^{Q1}$ represents a hydrogen atom, an alkyl group, or a substituted or unsubstituted aryl group, $R^{Q2}$ represents a hydrogen atom, an alkyl group, or a trialkylsilyl group, and Qn represents an integer of 1 to 3].

The chain polymerizable group is not particularly limited as long as the group is a functional group capable of radical polymerization and is, for example, a functional group containing a group having at least a carbon double bond. Specific examples thereof include a vinyl group, a vinyl ether group, a vinyl thioether group, a vinylphenyl group, an acryloyl group, a methacryloyl group, and a group containing at least one selected from derivatives thereof Among these, from the viewpoint that the reactivity is excellent, for example, a vinyl group, a vinylphenyl group, an acryloyl group, a methacryloyl group, and a group containing at least one selected from derivatives thereof are preferable as the chain polymerizable group.

The charge-transporting skeleton of the reactive group-containing charge transport material is not particularly limited as long as the skeleton is a known structure in the electrophotographic photoreceptor, and examples thereof include a structure conjugated with a nitrogen atom, which is a skeleton derived from a nitrogen-containing positive hole-transporting compound such as a triarylamine-based compound, a benzidine-based compound, or a hydrazone-based compound. Among these, for example, a triarylamine skeleton is preferable.

The reactive group-containing charge transport material having the reactive group and the charge-transporting skeleton, the non-reactive charge transport material, and the reactive group-containing non-charge transport material may be selected from known materials.

The protective layer may also contain other known additives.

The formation of the protective layer is not particularly limited, and a known forming method is used. For example, a coating film of a coating solution for forming a protective layer in which the above-described components are added to a solvent is formed, and the coating film is dried and, as necessary, subjected to a curing treatment such as heating.

Examples of the solvent for preparing the coating solution for forming a protective layer include an aromatic solvent such as toluene or xylene; a ketone-based solvent such as methyl ethyl ketone, methyl isobutyl ketone, or cyclohexanone; an ester-based solvent such as ethyl acetate or butyl acetate; an ether-based solvent such as tetrahydrofuran or dioxane; a cellosolve-based solvent such as ethylene glycol monomethyl ether; and an alcohol-based solvent such as isopropyl alcohol or butanol. These solvents are used alone or in the form of a mixture of two or more kinds thereof.

In addition, the coating solution for forming a protective layer may be a solvent-less coating solution.

Examples of the method of coating the photosensitive layer (such as the charge transport layer) with the coating solution for forming a protective layer include typical coating methods such as a dip coating method, a push-up coating method, a wire bar coating method, a spray coating method, a blade coating method, an air knife coating method, and a curtain coating method.

The film thickness of the protective layer is set to be, for example, preferably in a range of 1 μm or greater and 20 μm or less and more preferably in a range of 2 μm or greater and 10 μm or less.

Single Layer Type Photosensitive Layer

The single layer type photosensitive layer (charge generation/charge transport layer) is, for example, a layer containing a charge generation material, a charge transport material, a binder resin, and as necessary, other known additives. Further, these materials are the same as the materials described in the sections of the charge generation layer and the charge transport layer.

In a case where the single layer type photosensitive layer is the outermost surface layer, the content of the lubricant particles in the outermost surface region of the single layer type photosensitive layer is in the above-described ranges. Further, in a case where the single layer type photosensitive layer is the outermost surface layer, for example, it is preferable that the breaking energy of the outermost surface region is in the above-described ranges. Further, in a case where the single layer type photosensitive layer is the outermost surface layer, for example, it is preferable that the single layer type photosensitive layer contains, as the binder resin, at least one selected from the group consisting of a polyester resin and a polycarbonate resin. In a case where the single layer type photosensitive layer is the outermost surface layer, the total content of the polyester resin and the polycarbonate resin is, for example, preferably 80% by mass or greater, more preferably 95% by mass or greater, and still more preferably 98% by mass or greater with respect to the entire binder resin contained in the single layer type photosensitive layer.

Further, the content of the charge generation material in the single layer type photosensitive layer may be, for example, 0.1% by mass or greater and 10% by mass or less and preferably 0.8% by mass or greater and 5% by mass or less with respect to the total solid content. Further, the content of the charge transport material in the single layer type photosensitive layer may be, for example, 5% by mass or greater and 50% by mass or less with respect to the total solid content.

The method of forming the single layer type photosensitive layer is the same as the method of forming the charge generation layer or the charge transport layer.

The film thickness of the single layer type photosensitive layer may be, for example, 5 μm or greater and 50 μm or less and preferably 10 μm or greater and 40 μm or less.

Charging Device

As the charging device, for example, a contact-type charger using a conductive or semi-conductive charging roller, a charging brush, a charging film, a charging rubber blade, a charging tube, or the like is used. Further, a known charger such as a non-contact type roller charger, or a scorotron charger or a corotron charger using corona discharge is also used.

Exposure Device (Electrostatic Latent Image Forming Device)

Examples of the exposure device include an optical system device that exposes the surface of the electrophotographic photoreceptor to light such as a semiconductor laser beam, LED light, and liquid crystal shutter light in a predetermined image pattern. The wavelength of the light source is within the spectral sensitivity region of the electrophotographic photoreceptor. As the wavelength of a semiconductor laser, near infrared, which has an oscillation wavelength in the vicinity of 780 nm, is mostly used. However, the wavelength is not limited thereto, and a laser having an oscillation wavelength of approximately 600 nm or a laser having an oscillation wavelength of 400 nm or greater and 450 nm or less as a blue laser may also be used. Further, a surface emission type laser light source capable of outputting a multi-beam is also effective for forming a color image.

Developing Device

Examples of the developing device include a typical developing device that performs development in contact or non-contact with the developer. The developing device is not particularly limited as long as the developing device has the above-described functions, and is selected depending on the purpose thereof. Examples of the developing device include known developing machines having a function of attaching a one-component developer or a two-component developer to the electrophotographic photoreceptor using a brush, a roller, or the like. Among these, for example, a developing device formed of a developing roller having a surface on which a developer is held is preferably used.

The developer used in the developing device may be a one-component developer containing only a toner or a two-component developer containing a toner and a carrier. Further, the developer may be magnetic or non-magnetic. Known developers are employed as these developers.

Transfer Device (Primary Transfer Device and Secondary Transfer Device)

Examples of the transfer device include a known transfer charger such as a contact type transfer charger using a belt, a roller, a film, a rubber blade, or the like, a scorotron transfer charger, or a corotron transfer charger using corona discharge.

Intermediate Transfer Member

As the intermediate transfer member, a belt-like intermediate transfer member (intermediate transfer belt) containing semi-conductive polyimide, polyamide-imide, polycarbonate, polyarylate, polyester, rubber, or the like is used. Further, as the form of the intermediate transfer member, a drum-like intermediate transfer member may be used in addition to the belt-like intermediate transfer member.

Process Cartridge

A process cartridge according to an exemplary embodiment of the present disclosure is a process cartridge including an electrophotographic photoreceptor that includes a conductive substrate and a photosensitive layer disposed on the conductive substrate, and does not contain lubricant particles in a region of 30% from a surface of an outermost surface layer with respect to a film thickness of the outermost surface layer or contains 5% by mass or less of the lubricant particles with respect to the entire region, a cleaning device that has a cleaning blade and cleans the surface of the electrophotographic photoreceptor by bringing the cleaning blade into contact with the surface, in which the dynamic friction coefficient in the contact portion between the electrophotographic photoreceptor and the cleaning blade is 0.2 or greater and 0.6 or less, and the process cartridge is attachable to and detachable from the image forming apparatus.

Since the process cartridge of the present exemplary embodiment has the above-described configuration, in a case where the process cartridge is applied to the image forming apparatus, both the streak-like image defects caused by local turn-up of the blade and the filming caused by body contact are suppressed without increasing the amount of the toner to be supplied to the cleaning portion and without applying a lubricant to the surface of the photoreceptor.

The details and the aspects of the electrophotographic photoreceptor, the cleaning device, and the relative friction coefficient in the process cartridge of the present exemplary embodiment are the same as the details and the aspects of the electrophotographic photoreceptor, the cleaning device, and the relative friction coefficient in the image forming apparatus described above.

The process cartridge of the present exemplary embodiment may further include at least one selected from the group consisting of a charging device, an electrostatic latent image forming device, a developing device, and a transfer device, as necessary.

EXAMPLES

Hereinafter, exemplary embodiments of the invention will be described in detail based on examples, but the exemplary embodiments of the invention are not limited to the examples.

In the following description, "parts" and "%" are on a mass basis unless otherwise specified.

In the following description, the synthesis, the treatment, the production, and the like are carried out at room temperature (25° C.±3° C.) unless otherwise specified.

Preparation of Cleaning Blade

Cleaning Blade (1)

100 parts by mass of polycaprolactone polyol (molecular weight of 2,000) as a high-molecular-weight polyol component reacts with 58 parts by mass of 4,4'-diphenylmethane diisocyanate (MDI: manufactured by DIC Corporation) as a polyisocyanate component at 115° C. for 20 minutes. Thereafter, 6.1 parts by mass of 1,4-butanediol and 2.6 parts by mass of trimethylolpropane as low-molecular-weight polyol components are mixed, and heated and cured in a mold maintained at 140° C. for 40 minutes. The mixture is molded, a rubber elastic member that is cut-processed into a shape with a width of 14 mm, a thickness of 1.9 mm, and a length of 330 mm is obtained, and this rubber elastic member adheres to a support plate, thereby obtaining a blade base material.

100 parts by mass of ethyl acetate as an organic solvent, 20 parts by mass of 4,4'-diphenylmethane diisocyanate (MDI: "MILLIONATE MT" manufactured by Tosoh Corporation, melting point: 38° C.) as an isocyanate compound, and 2 parts by mass of an acrylic silicone polymer (MODIPER FS700: manufactured by NOF Corporation) as an acrylic polymer having a siloxane bond which is a specific polymer are dispersed and mixed in a ball mill for 5 hours, thereby obtaining a surface treatment liquid.

The blade base material is immersed in the surface treatment liquid for 60 seconds while the surface treatment liquid is maintained at 23° C., and dried in an environment of room temperature (25° C.) for 1 minute. Next, the surface of the dried blade base material is subjected to finish wiping with a sponge containing a small amount of toluene, further dried in an environment of 25° C. for 1 minute, and heated in an oven maintained at 80° C. for 1 hour, thereby obtaining a cleaning blade (1).

Cleaning Blades (2) to (10)

Each of cleaning blades (2) to (10) is obtained in the same manner as that for the cleaning blade (1) except that the addition amount of the polyisocyanate component used in the preparation of the blade base material ("base material MDI (parts)" in the table), the addition amount of the acrylic silicone polymer used in the preparation of the surface treatment liquid ("surface silicone P (parts)" in the table), the addition amount of the acrylic fluoropolymer used in the preparation of the surface treatment liquid ("surface fluorine P (parts)" in the table), and the addition amount of the isocyanate compound used in the preparation of the surface treatment liquid ("surface MDI (parts)" in the table) are changed as listed in Table 1.

Further, the acrylic fluoropolymer denotes an acrylic polymer having a fluorine atom which is a specific polymer (MODIPER F600: manufactured by NOF Corporation).

Measurement of Cleaning Blade

The M100 and the impact resilience of the obtained cleaning blade are acquired by the above-described methods. The results are listed in Table 1.

Preparation of Photoreceptor

Photoreceptor (1)

As the polyester resin (1), a polyester resin (PE1) formed of 50% by mole of the dicarboxylic acid unit (A2-3) and 50% by mole of the diol unit (B1-4) and having a weight-average molecular weight of 50,000 is prepared.

Formation of Undercoat Layer

An aluminum cylindrical tube having an outer diameter of 30 mm, a length of 250 mm, and a thickness of 1 mm is prepared as a conductive substrate.

100 parts of zinc oxide (average particle diameter of 70 nm, specific surface area of 15 $m^2/g$, manufactured by Tayca Corporation) is stirred and mixed with 500 parts of toluene, 1.3 parts of a silane coupling agent (trade name: KBM603, manufactured by Shin-Etsu Chemical Co., Ltd., N-2-(aminoethyl)-3-aminopropyltrimethoxysilane) is added thereto, and the mixture is stirred for 2 hours. Thereafter, toluene is distilled off under reduced pressure and baked at 120° C. for 3 hours to obtain zinc oxide subjected to a surface treatment with a silane coupling agent.

110 parts of the surface-treated zinc oxide is stirred and mixed with 500 parts of tetrahydrofuran, a solution obtained by dissolving 0.6 part of alizarin in 50 parts of tetrahydrofuran is added thereto, and the mixture is stirred at 50° C. for 5 hours. Thereafter, the solid content is separated by filtration by carrying out filtration under reduced pressure and dried at 60° C. under reduced pressure, thereby obtaining zinc oxide with alizarin.

100 parts of a solution obtained by dissolving 60 parts of the zinc oxide with alizarin, 13.5 parts of a curing agent (blocked isocyanate, trade name: SUMIDUR 3175, manufactured by Sumitomo Bayer Urethane Co., Ltd.), and 15 parts of a butyral resin (trade name: S-LEC BM-1, manufactured by Sekisui Chemical Co., Ltd.) in 68 parts of methyl ethyl ketone is mixed with 5 parts of methyl ethyl ketone, and the solution is dispersed in a sand mill for 2 hours using 1 mmp glass beads, thereby obtaining a dispersion liquid. 0.005 part of dioctyltin dilaurate as a catalyst and 4 parts of silicone resin particles (trade name: TOSPEARL 145, manufactured by Momentive Performance Materials Inc.) are added to the dispersion liquid, thereby obtaining a coating solution for forming an undercoat layer. The outer peripheral surface of the conductive substrate is coated with the coating solution for forming an undercoat layer by a dip coating method, and dried and cured at 170° C. for 40 minutes to form an undercoat layer. The average thickness of the undercoat layer is 25 m.

Formation of Charge Generation Layer

A mixture of 15 parts of hydroxygallium phthalocyanine as a charge generation substance (having diffraction peaks at positions where Bragg angles (2θ±0.2°) in the X-ray diffraction spectrum using Cuka characteristic X-rays are at least 7.5°, 9.9°, 12.5, 16.3°, 18.6°, 25.1°, and 28.3°), 10 parts of a vinyl chloride-vinyl acetate copolymer resin (trade name: VMCH, Nippon Unicar Company Limited) as a binder resin, and 200 parts of n-butyl acetate is dispersed in a sand mill for 4 hours using glass beads having a diameter of 1 mm. 175 parts of n-butyl acetate and 180 parts of methyl ethyl ketone are added to the dispersion liquid, and the mixture is stirred, thereby obtaining a coating solution for forming a charge generation layer. The undercoat layer is immersed in and coated with the coating solution for forming a charge generation layer, and dried at room temperature (25° C.±3° C.) to form a charge generation layer having an average thickness of 0.18 m.

Formation of Charge Transport Layer 60 parts of the polyester resin (PE1) as a binder resin and 40 parts of CTM-1 as a charge transport material are dissolved in 270 parts of tetrahydrofuran and 30 parts of toluene, thereby obtaining a coating solution for forming a charge transport layer. The charge generation layer is immersed in and coated with the coating solution for forming a charge transport layer, and dried at 145° C. for 30 minutes to form a charge transport layer having an average thickness of 40 μm.

CTM-1

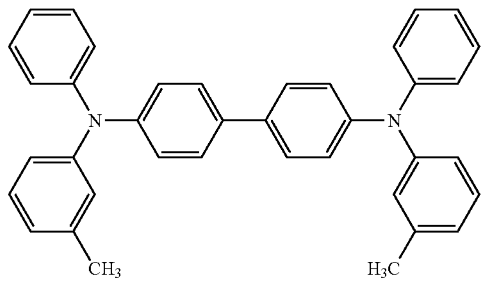

The outermost surface region of the obtained photoreceptor contains no lubricant particles.

The breaking energy of the outermost surface layer of the obtained photoreceptor, which is acquired by the above-described method, is 20.3 $mJ/mm^3$.

Photoreceptor (2)

As the polycarbonate resin (1), a polycarbonate resin (PC1) formed of 50% by mole of the constitutional unit (Ca2-3) and 50% by mole of the constitutional unit (Cb1-4) and having a weight-average molecular weight of 45,000 is prepared.

A photoreceptor (2) is obtained in the same manner as that for the photoreceptor (1) except that the polycarbonate resin (1) is used in place of the polyester resin (1).

The outermost surface region of the obtained photoreceptor contains no lubricant particles.

The breaking energy of the outermost surface layer of the obtained photoreceptor is acquired by the above-described method, and the value is 10.6 $mJ/mm^3$.

Photoreceptor (3)

Formation of Single Layer Type Photosensitive Layer 45.75 parts of the polyester resin (PE1) as a binder resin, 1.25 parts of V-type hydroxygallium phthalocyanine as a charge generation material (having diffraction peaks at positions where Bragg angles (2θ±0.2°) in the X-ray diffraction spectrum using Cuka characteristic X-rays are at least 7.3°, 16.0°, 24.9°, and 28.0°), 9 parts of ETM-1 as an electron transport material, 44 parts of CTM-1 as a charge transport material, and 175 parts of tetrahydrofuran and 75 parts of toluene as solvents are mixed, and the mixture is subjected to a dispersion treatment in a sand mill for 4 hours using glass beads having a diameter of 1 mm, thereby obtaining a coating solution for forming a single layer type photosensitive layer.

An aluminum substrate having an outer diameter of 30 mm, a length of 244.5 mm, and a thickness of 1 mm is coated with the obtained coating solution for forming a photosensitive layer by a dip coating method, and dried and cured at a temperature of 110° C. for 40 minutes to form a single layer type photosensitive layer having an average thickness of 36 m.

ETM-1

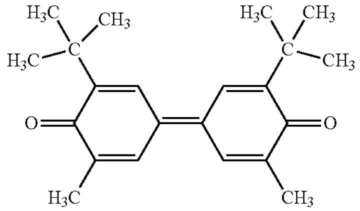

CTM-1

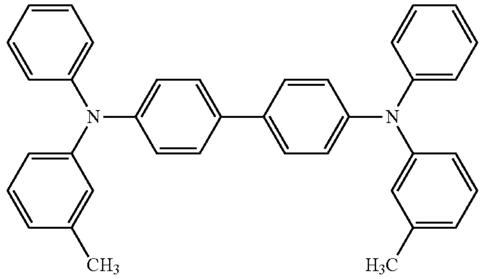

The outermost surface region of the obtained photoreceptor contains no lubricant particles.

The breaking energy of the outermost surface layer of the obtained photoreceptor is acquired by the above-described method, and the value is 18.9 $mJ/mm^3$.

Photoreceptor (4)

A polymethyl methacrylate resin (A1) that is formed of a polymethyl methacrylate resin having the following repeating unit and has a weight-average molecular weight of 50,000 is prepared.

Repeating unit: $[—CH_2—C(CH_3)(COOCH_3)—]_n$

A photoreceptor (4) is obtained in the same manner as that for the photoreceptor (1) except that the polymethyl methacrylate resin (A1) is used in place of the polyester resin (1).

The outermost surface region of the obtained photoreceptor contains no lubricant particles.

The breaking energy of the outermost surface layer of the obtained photoreceptor is acquired by the above-described method, and the value is 7.8 $mJ/mm^3$.

Preparation, Measurement, and Evaluation of Image Forming Apparatus

Each of image forming apparatuses of Examples 1 to 9 and Comparative Examples 1 to 3 is obtained by attaching the cleaning device having the blade listed in Table 1 and the photoreceptor listed in Table 1 to Apeos C-8180 (manufactured by FUJIFILM Business Innovation Corp.).

The relative friction coefficient is acquired by the method described above. The results are listed in Table 1 ("dynamic friction coefficient" in the table).

Streak-like Image Defect Caused by Local Turn-up of Blade 12500 sheets of images with an image density of 0.5% are formed on A4 paper using the obtained image forming apparatus in a room-temperature and low-humidity environment (21° C., 10%). With the 12,500th image formed, the presence or absence of streak-like image defects caused by local turn-up of the blade is visually confirmed, and the evaluation is performed according to the following standards. The results are listed in Table 1 ("streak defect" in the table).

Standards

A: Defects have not occurred.

B: Defects have slightly occurred outside the image area at a sufficiently acceptable level in practical use.

C: Defects have occurred outside the image area at an acceptable level in practical use.

D: A plurality of defects have occurred at an unacceptable level in practical use.

E: Multiple defects have occurred at an unacceptable level in practical use.

Filming Caused by Body Contact of Blade 12,500 sheets of images with an image density of 0.5% are formed on A4 paper using the obtained image forming apparatus in a room-temperature and low-humidity environment (21° C., 10%). The surface of the photoreceptor after formation of the 12,500th image is visually confirmed whether or not the filming caused by body contact of the blade is present, and the evaluation is performed according to the following standards. The results are listed in Table 1 ("filming" in the table).

Standards

A: Filming has not occurred.

B: Filming has slightly occurred at a sufficiently acceptable level in practical use.

C: Filming has occurred at an acceptable level in practical use.

D: Filming has occurred at an unacceptable level in practical use.

E: Filming has severely occurred at an unacceptable level in practical use.

As listed in Table 1, it is found that in the examples, both streak-like image defects caused by local turn-up of the blade and filming caused by body contact of the blade are suppressed as compared with the comparative example.

The present disclosure includes the following aspects.

(((1)))

An image forming apparatus comprising:

an electrophotographic photoreceptor that includes a conductive substrate and a photosensitive layer disposed on the conductive substrate, and does not contain lubricant particles in a region of 30% from a surface of an outermost surface layer with respect to a film thickness of the outermost surface layer or contains 5% by mass or less of the lubricant particles with respect to an entirety of the region;

a charging device that charges a surface of the electrophotographic photoreceptor;

an electrostatic latent image forming device that forms an electrostatic latent image on the charged surface of the electrophotographic photoreceptor;

a developing device that develops the electrostatic latent image formed on the surface of the electrophotographic photoreceptor with a developer containing an electrostatic charge image developing toner to form a toner image;

a transfer device that transfers the toner image to a surface of a recording medium; and a cleaning device that has a cleaning blade and cleans the surface of the electrophotographic photoreceptor by bringing the cleaning blade into contact with the surface after the toner image is transferred by the transfer device, wherein a dynamic friction coefficient in a contact portion between the electrophotographic photoreceptor and the cleaning blade is 0.2 or greater and 0.6 or less.

TABLE 1

| | Photoreceptor | Blade | | | | | | Impact | Dynamic | Evaluation | |
|---|---|---|---|---|---|---|---|---|---|---|---|
| | | | Base material | Surface | | | | | | | |
| | Type | Type | MDI (parts) | Silicone P (parts) | Fluorine P (parts) | MDI (parts) | M100 (MPa) | resilience (%) | friction coefficient | Streak defect | Filming |
| Example 1 | (1) | (1) | 58 | 2 | 0 | 20 | 18.0 | 20 | 0.21 | A | A |
| Example 2 | (1) | (2) | 58 | 0 | 2 | 20 | 18.0 | 20 | 0.20 | A | A |
| Example 3 | (1) | (3) | 47 | 2 | 0 | 20 | 9.0 | 18 | 0.58 | A | A |
| Example 4 | (1) | (4) | 53 | 2 | 0 | 20 | 23.0 | 20 | 0.25 | A | C |
| Example 5 | (1) | (5) | 44 | 2 | 0 | 20 | 7.9 | 25 | 0.50 | C | A |
| Example 6 | (1) | (6) | 40 | 2 | 0 | 25 | 8.9 | 33 | 0.53 | C | B |
| Example 7 | (1) | (7) | 54 | 2 | 0 | 15 | 11.3 | 14 | 0.49 | B | B |
| Example 8 | (2) | (1) | 58 | 2 | 0 | 20 | 18.0 | 20 | 0.22 | A | A |
| Example 9 | (3) | (1) | 58 | 2 | 0 | 20 | 18.0 | 20 | 0.23 | A | A |
| Example 10 | (4) | (1) | 58 | 2 | 0 | 20 | 18.0 | 20 | 0.22 | A | B |
| Example 11 | (4) | (5) | 44 | 2 | 0 | 20 | 7.9 | 25 | 0.47 | B | B |
| Example 12 | (4) | (4) | 53 | 2 | 0 | 20 | 23.0 | 20 | 0.26 | A | C |
| Comparative Example 1 | (1) | (8) | 50 | 0 | 0 | 0 | 18.0 | 20 | 0.63 | E | B |
| Comparative Example 2 | (1) | (9) | 50 | 4 | 0 | 20 | 18.0 | 20 | 0.18 | B | E |
| Comparative Example 3 | (1) | (10) | 50 | 0 | 4 | 20 | 18.0 | 20 | 0.17 | B | E |

(((2)))

The image forming apparatus according to (((1))), wherein the outermost surface layer of the electrophotographic photoreceptor has a breaking energy of 8.0 $mJ/mm^3$ or greater.

(((3)))

The image forming apparatus according to (((2))), wherein the outermost surface layer of the electrophotographic photoreceptor contains at least one selected from the group consisting of a polyester resin and a polycarbonate resin.

(((4)))

The image forming apparatus according to any one of (((1))) to (((3))), wherein a 100% modulus of the cleaning blade in the contact portion with the electrophotographic photoreceptor at 23° C. is 8 MPa or greater and 23 MPa or less.

(((5)))

The image forming apparatus according to any one of (((1))) to (((4))), wherein an impact resilience of the cleaning blade in the contact portion with the electrophotographic photoreceptor at 23° C. is 15% or greater and 32% or less.

(((6)))

The image forming apparatus according to any one of (((1))) to (((5))), wherein a surface layer of the cleaning blade in the contact portion with the electrophotographic photoreceptor contains at least one polymer selected from the group consisting of a polymer having a siloxane bond and a polymer having a fluorine atom.

(((7)))

The image forming apparatus according to (((6))), wherein the polymer is an acrylic polymer.

(((8)))

A process cartridge comprising:

an electrophotographic photoreceptor that includes a conductive substrate and a photosensitive layer disposed on the conductive substrate, and does not contain lubricant particles in a region of 30% from a surface of an outermost surface layer with respect to a film thickness of the outermost surface layer or contains 5% by mass or less of the lubricant particles with respect to an entirety of the region; and a cleaning device that has a cleaning blade and cleans the surface of the electrophotographic photoreceptor by bringing the cleaning blade into contact with the surface, wherein a dynamic friction coefficient in a contact portion between the electrophotographic photoreceptor and the cleaning blade is 0.2 or greater and 0.6 or less, and the process cartridge is attachable to and detachable from an image forming apparatus.

(((9)))

The process cartridge according to (((8))), wherein the outermost surface layer of the electrophotographic photoreceptor has a breaking energy of 8.0 $mJ/mm^3$ or greater.

(((10)))

The process cartridge according to (((8))) or (((9))), wherein a 100% modulus of the cleaning blade in the contact portion with the electrophotographic photoreceptor at 23° C. is 8 MPa or greater and 23 MPa or less.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

an electrophotographic photoreceptor that includes a conductive substrate and a photosensitive layer disposed on the conductive substrate, and does not contain lubricant particles in a region of 30% from a surface of an outermost surface layer with respect to a film thickness of the outermost surface layer or contains 5% by mass or less of the lubricant particles with respect to an entirety of the region;

a charging device that charges a surface of the electrophotographic photoreceptor;

an electrostatic latent image forming device that forms an electrostatic latent image on the charged surface of the electrophotographic photoreceptor;

a developing device that develops the electrostatic latent image formed on the surface of the electrophotographic photoreceptor with a developer containing an electrostatic charge image developing toner to form a toner image;

a transfer device that transfers the toner image to a surface of a recording medium; and a cleaning device that has a cleaning blade and cleans the surface of the electrophotographic photoreceptor by bringing the cleaning blade into contact with the surface after the toner image is transferred by the transfer device, wherein a dynamic friction coefficient in a contact portion between the electrophotographic photoreceptor and the cleaning blade is 0.2 or greater and 0.6 or less.

2. The image forming apparatus according to claim 1, wherein the outermost surface layer of the electrophotographic photoreceptor has a breaking energy of 8.0 $mJ/mm^3$ or greater.

3. The image forming apparatus according to claim 2, wherein the outermost surface layer of the electrophotographic photoreceptor contains at least one selected from the group consisting of a polyester resin and a polycarbonate resin.

4. The image forming apparatus according to claim 3, wherein a 100% modulus of the cleaning blade in the contact portion with the electrophotographic photoreceptor at 23° C. is 8 MPa or greater and 23 MPa or less.

5. The image forming apparatus according to claim 3, wherein an impact resilience of the cleaning blade in the contact portion with the electrophotographic photoreceptor at 23° C. is 15% or greater and 32% or less.

6. The image forming apparatus according to claim 3, wherein a surface layer of the cleaning blade in the contact portion with the electrophotographic photoreceptor contains at least one polymer selected from the group consisting of a polymer having a siloxane bond and a polymer having a fluorine atom.

7. The image forming apparatus according to claim 6, wherein the polymer is an acrylic polymer.

8. The image forming apparatus according to claim 2, wherein a 100% modulus of the cleaning blade in the contact portion with the electrophotographic photoreceptor at 23° C. is 8 MPa or greater and 23 MPa or less.

9. The image forming apparatus according to claim 2, wherein an impact resilience of the cleaning blade in the contact portion with the electrophotographic photoreceptor at 23° C. is 15% or greater and 32% or less.

10. The image forming apparatus according to claim 2, wherein a surface layer of the cleaning blade in the contact portion with the electrophotographic photoreceptor contains at least one polymer selected from the group consisting of a polymer having a siloxane bond and a polymer having a fluorine atom.

11. The image forming apparatus according to claim 10, wherein the polymer is an acrylic polymer.

12. The image forming apparatus according to claim 1, wherein a 100% modulus of the cleaning blade in the contact portion with the electrophotographic photoreceptor at 23° C. is 8 MPa or greater and 23 MPa or less.

13. The image forming apparatus according to claim 1, wherein an impact resilience of the cleaning blade in the contact portion with the electrophotographic photoreceptor at 23° C. is 15% or greater and 32% or less.

14. The image forming apparatus according to claim 1, wherein a surface layer of the cleaning blade in the contact portion with the electrophotographic photoreceptor contains at least one polymer selected from the group consisting of a polymer having a siloxane bond and a polymer having a fluorine atom.

15. The image forming apparatus according to claim 14, wherein the polymer is an acrylic polymer.

16. A process cartridge comprising:

an electrophotographic photoreceptor that includes a conductive substrate and a photosensitive layer disposed on the conductive substrate, and does not contain lubricant particles in a region of 30% from a surface of an outermost surface layer with respect to a film thickness of the outermost surface layer or contains 5% by mass or less of the lubricant particles with respect to an entirety of the region; and a cleaning device that has a cleaning blade and cleans the surface of the electrophotographic photoreceptor by bringing the cleaning blade into contact with the surface, wherein a dynamic friction coefficient in a contact portion between the electrophotographic photoreceptor and the cleaning blade is 0.2 or greater and 0.6 or less, and the process cartridge is attachable to and detachable from an image forming apparatus.

17. The process cartridge according to claim 16, wherein the outermost surface layer of the electrophotographic photoreceptor has a breaking energy of 8.0 $mJ/mm^3$ or greater.

18. The process cartridge according to claim 17, wherein a 100% modulus of the cleaning blade in the contact portion with the electrophotographic photoreceptor at 23° C. is 8 MPa or greater and 23 MPa or less.

19. The process cartridge according to claim 16, wherein a 100% modulus of the cleaning blade in the contact portion with the electrophotographic photoreceptor at 23° C. is 8 MPa or greater and 23 MPa or less.

* * * * *